United States Patent
Lee et al.

(10) Patent No.: US 11,109,404 B2
(45) Date of Patent: Aug. 31, 2021

(54) METHOD FOR TERMINAL TRANSMITTING UPLINK CONTROL CHANNEL IN WIRELESS COMMUNICATION SYSTEM, AND COMMUNICATION DEVICE USING SAME

(71) Applicant: LG Electronics Inc., Seoul (KR)

(72) Inventors: Seungmin Lee, Seoul (KR); Suckchel Yang, Seoul (KR); Seonwook Kim, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 16/503,333

(22) Filed: Jul. 3, 2019

(65) Prior Publication Data

US 2019/0327759 A1    Oct. 24, 2019

Related U.S. Application Data

(63) Continuation of application No. PCT/KR2018/000363, filed on Jan. 8, 2018.

(60) Provisional application No. 62/446,418, filed on Jan. 14, 2017, provisional application No. 62/444,342, filed on Jan. 9, 2017, provisional application No. 62/443,648, filed on Jan. 7, 2017.

(51) Int. Cl.
*H04W 72/12* (2009.01)
*H04L 5/00* (2006.01)

(52) U.S. Cl.
CPC ....... *H04W 72/1284* (2013.01); *H04L 5/0048* (2013.01); *H04L 5/0053* (2013.01); *H04L 5/0007* (2013.01)

(58) Field of Classification Search
None
See application file for complete search history.

(56) References Cited

U.S. PATENT DOCUMENTS 8,374,076 B2    2/2013    Kim et al.
8,498,198 B2    7/2013    Kim et al.
(Continued)

FOREIGN PATENT DOCUMENTS

EP    3079272    10/2016
KR    20120125535    11/2012
(Continued)

OTHER PUBLICATIONS

U.S. Appl. No. 62/433,677, filed Dec. 13, 2016, "Base Stations, User Equipments, and Related Communication Methods", Yin et al., p. 1-37, Fig. 1-20.*

(Continued)

*Primary Examiner* — Gregory B Sefcheck
(74) *Attorney, Agent, or Firm* — Fish & Richardson P.C.

(57) ABSTRACT

Provided are a method for a terminal transmitting an uplink control channel in a wireless communication system, and a device using same. The method comprises: determining the overlapping or not between a first physical uplink control channel (PUCCH) and a second PUCCH; and determining a transmission method for the first PUCCH and the second PUCCH on the basis of the determining. Here, the first PUCCH is an uplink control channel that is frequency division multiplexed (FDM) with a data channel, and the second PUCCH is an uplink control channel that is time division multiplexed (TDM) with the data channel.

18 Claims, 18 Drawing Sheets

(56) References Cited

U.S. PATENT DOCUMENTS

| | | | | |
|---|---|---|---|---|
| 8,737,334 | B2* | 5/2014 | Ahn | H04L 5/0048 |
| | | | | 370/312 |
| 8,804,481 | B2 | 8/2014 | Kim et al. | |
| 8,958,342 | B2* | 2/2015 | Dinan | H04L 1/1835 |
| | | | | 370/254 |
| 8,964,593 | B2* | 2/2015 | Dinan | H04B 7/2618 |
| | | | | 370/252 |
| 8,964,683 | B2* | 2/2015 | Dinan | H04W 52/146 |
| | | | | 370/329 |
| 8,995,381 | B2* | 3/2015 | Dinan | H04W 72/0406 |
| | | | | 370/329 |
| 9,179,425 | B2* | 11/2015 | Dinan | H04W 52/386 |
| 9,241,326 | B2* | 1/2016 | Dinan | H04B 7/2618 |
| 9,258,092 | B2* | 2/2016 | Heo | H04L 5/0048 |
| 9,374,211 | B2 | 6/2016 | Kim et al. | |
| 9,876,618 | B2* | 1/2018 | Heo | H04L 5/001 |
| 9,930,654 | B2* | 3/2018 | Nory | H04W 16/14 |
| 10,034,275 | B2* | 7/2018 | Kim | H04B 7/26 |
| 10,171,276 | B2 | 1/2019 | Stern-Berkowitz et al. | |
| 10,285,191 | B2 | 5/2019 | Hwang et al. | |
| 10,349,397 | B2* | 7/2019 | Nory | H04L 5/0044 |
| 10,397,946 | B2* | 8/2019 | Lee | H04L 5/00 |
| 10,484,875 | B2 | 11/2019 | Chen et al. | |
| 10,574,416 | B2 | 2/2020 | Ahn et al. | |
| 10,660,074 | B2 | 5/2020 | Chen et al. | |
| 10,693,610 | B2 | 6/2020 | Liu et al. | |
| 10,716,100 | B2 | 7/2020 | Yin et al. | |
| 10,716,125 | B2 | 7/2020 | Rico Alvarnio et al. | |
| 10,736,047 | B2 | 8/2020 | Yang et al. | |
| 2012/0044889 | A1* | 2/2012 | Jen | H04L 1/1854 |
| | | | | 370/329 |
| 2015/0249980 | A1 | 9/2015 | You et al. | |
| 2015/0289211 | A1 | 10/2015 | Lee et al. | |
| 2016/0183203 | A1* | 6/2016 | Larsson | H04W 52/386 |
| | | | | 370/329 |
| 2016/0205632 | A1 | 7/2016 | Yi et al. | |
| 2018/0083752 | A1 | 3/2018 | Kim et al. | |
| 2018/0132229 | A1* | 5/2018 | Li | H04L 1/0013 |
| 2018/0167933 | A1* | 6/2018 | Yin | H04W 28/0231 |
| 2018/0352582 | A1 | 12/2018 | Yi et al. | |
| 2018/0368138 | A1* | 12/2018 | Jung | H04W 72/0413 |
| 2018/0368168 | A1* | 12/2018 | Jung | H04W 72/1289 |
| 2018/0368169 | A1* | 12/2018 | Jung | H04W 72/1289 |
| 2019/0149269 | A1* | 5/2019 | Chatterjee | H04L 1/0693 |
| | | | | 370/329 |
| 2019/0159191 | A1* | 5/2019 | Kim | H04L 5/00 |
| 2019/0230683 | A1* | 7/2019 | Akkarakaran | H04L 5/0044 |
| 2019/0261391 | A1* | 8/2019 | Kundu | H04L 1/0026 |
| 2019/0327759 | A1 | 10/2019 | Lee et al. | |
| 2020/0245350 | A1 | 7/2020 | Lee et al. | |

FOREIGN PATENT DOCUMENTS

| | | |
|---|---|---|
| KR | 20140047495 | 4/2014 |
| KR | 20160122199 | 10/2016 |
| WO | WO2016068542 | 5/2016 |
| WO | WO2016164306 | 10/2016 |
| WO | WO2019098687 | 5/2019 |
| WO | WO2019098697 | 5/2019 |

OTHER PUBLICATIONS

U.S. Appl. No. 62/417,386, filed Nov. 4, 2016, "Multiplexing of PUCCH and other channels", Li, p. 1-21.*

Huawei, HiSilicon, "Handling collision between PUCCH and sPUCCH," R1-1611164, 3GPP TSG RAN WG1 Meeting #87, Reno, USA, dated Nov. 5, 2016, 6 pages.

CATT, "Discussion on the simultaneous transmissions of (s)PUCCH and (s)PUSCH," R1-1611355, 3GPP TSG RAN WG1 Meeting #87, Reno, USA, dated Nov. 5, 2016, 7 pages.

MediaTek Inc., "Multiplexing of PUCCH and other channels," R1-1612140, 3GPP TSG RAN WG1 Meeting #87, Reno, USA, dated Nov. 5, 2016, 7 pages.

Huawei, HiSilicon, "Handling collision between sPUCCH/PUCCH and PUSCH/sPUSCH," R1-1612828, 3GPP TSG RAN WG1 Meeting #87, Reno, USA, dated Nov. 5, 2016, 7 pages.

Intel Corporation, "Remaining aspects of PUCCH for MTC," R1-156502, 3GPP TSG RAN WG1 Meeting #83, Anaheim, USA, dated Nov. 16-20, 2015, 5 pages.

Intel Corporation, "On PUCCH and UCI transmissions for MTC," R1-155302, 3GPP TSG RAN WG1 Meeting #82bis, Malmo, Sweden, dated Oct. 5-9, 2015, 6 pages.

Sierra Wireless, "Summary of Informal Email Discussion on PUSCH," R1-157501, 3GPP TSG RAN WG1 Meeting #83, Anaheim, USA, dated Nov. 15-22, 2015, 15 pages.

Extended European Search Report in European Application No. 18736769.3, dated Oct. 24, 2019, 11 pages.

Korean Notice of Allowance in Korean Appln. No. 10-2020-7023763, dated Sep. 1, 2020, 7 pages (with English translation).

Korean Notice of Allowance in Korean Application No. 10-2019-7015814, dated May 26, 2020, 8 pages (with English translation).

United States Notice of Allowance in U.S. Appl. No. 16/850,837, dated Aug. 26, 2020, 14 pages.

Japanese Office Action in Japanese Appln. No. 2019-536880, dated Sep. 29, 2020, 7 pages (with English translation).

Nokia, Alcatel-Lucent Shanghai Bell, "On 2-OS sPUSCH structure and details of UL DMRS in shorter TTI," R1-1612153, 3GPP TSG-RAN WG1 Meeting #87, Reno, Nevada, US, Nov. 14-18, 2016, 6 pages.

IN Office Action in Indian Appln. No. 201917025274, dated Feb. 2, 2021, 8 pages (with English translation).

* cited by examiner

FIG. 17
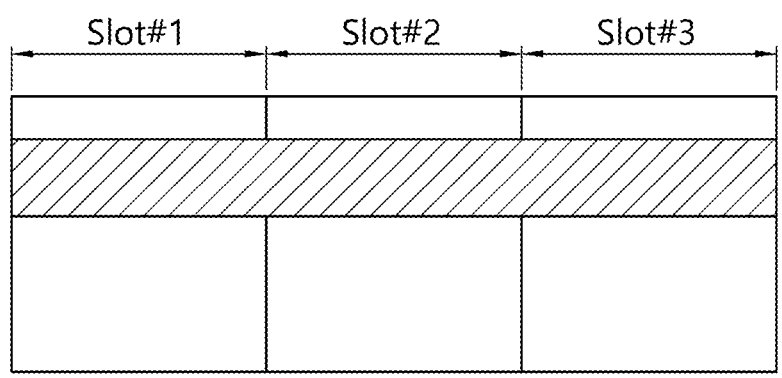
 : Multiple Slot LGD_PUCCH

METHOD FOR TERMINAL TRANSMITTING UPLINK CONTROL CHANNEL IN WIRELESS COMMUNICATION SYSTEM, AND COMMUNICATION DEVICE USING SAME

CROSS-REFERENCE TO RELATED APPLICATIONS

This application is a continuation of International Application PCT/KR2018/000363, filed on Jan. 8, 2018, which claims the benefit of U.S. Provisional Patent Applications No. 62/443,648, filed on Jan. 7, 2017, U.S. Provisional Patent Applications No. 62/444,342, filed on Jan. 9, 2017, and U.S. Provisional Patent Applications No. 62/446,418, filed on Jan. 14, 2017. The disclosures of the prior applications are incorporated by reference in their entirety.

BACKGROUND OF THE INVENTION

Field of the Invention

The present invention relates to wireless communication and, more particularly, to a method for transmitting uplink control channel in a wireless communication system performed by a terminal and a communication apparatus using the method.

Related Art

As more communication devices have demanded higher communication capacity, there has been increasing necessity for enhanced mobile broadband communication relative to the conventional radio access technology (RAT). In addition, the massive machine type communication (MTC) is also one of the main issues to be considered in the next generation communication, which provides various services irrespective of time and place by connecting a plurality of devices and objects to each other.

Further, a communication system design in which a service or a UE sensitive to reliability and latency is considered has been under discussion. The next generation radio access technology taking into consideration of enhanced mobile broadband communication, massive MTC, ultra-reliable and low-latency communication (URLLC), and the like may be referred to as a new radio access technology (RAT) or new radio (NR).

Meanwhile, in NR, different from the conventional communication system, uplink control channels of different multiple types may be introduced. For example, there may be an uplink control channel through which the amount of transmittable information is relatively limited but the amount of information to be used is also small and an uplink control channel through which the amount of transmittable information is relatively great and the amount of supported information to be used is also great. In addition, transmission timings after receiving data of the uplink control channels of different types may be differently configured.

In NR, in the case that collision or overlap occurs between uplink control channels of different multiple types or the uplink control channels and data channel or sound reference signal (SRS), and the like, it becomes problematic on how to deal with it.

SUMMARY OF THE INVENTION

The present invention provides a method for transmitting uplink control channel in a wireless communication system performed by a terminal and a communication apparatus using the method.

In one aspect, provided is a method for transmitting uplink control channel performed by a user equipment. The method includes determining whether a first physical uplink control channel (PUCCH) and a second PUCCH are overlapped and deciding a transmission technique of the first PUCCH and the second PUCCH based on the determination. The first PUCCH is an uplink control channel which is frequency division multiplexing (FDM) with a data channel, and the second PUCCH is an uplink control channel which is time division multiplexing (TDM) with the data channel.

The method may further include receiving a downlink grant, wherein whether to piggyback the second PUCCH to the first PUCCH is decided based on a time gap between a reception timing of the downlink grant and a transmission timing of the second PUCCH.

When the first PUCCH and the second PUCCH are overlapped, a resource of the first PUCCH which is overlapped may be punctured.

When a resource assigned to the first PUCCH is M (M is a natural number of 1 or more) resource blocks and the resource overlapped with the second PUCCH is K (K is a natural number of 1 or more) resource blocks among the M resource blocks in a frequency domain, discrete Fourier transform (DFT) corresponding to a size of the M resource blocks may be performed in a symbol of a time domain on which the overlap is not occurred, and DFT corresponding to a size of the M-K resource blocks may be performed in a symbol of a time domain on which the overlap is occurred.

When the second PUCCH and the data channel are overlapped, a symbol punctured in the data channel may be differently decided according to the symbol on which the second PUCCH is located.

When the first PUCCH and the second PUCCH are overlapped, the first PUCCH transmission may be dropped.

When the first PUCCH and the second PUCCH are overlapped, only the region of the first PUCCH may be not transmitted.

When the first PUCCH and the second PUCCH are overlapped, the region of the first PUCCH which is overlapped may be transmitted by reducing transmission power.

A modulation scheme of a preconfigured modulator order or less may be used in the first PUCCH.

When a modulation scheme of a modulation order which is greater than a preconfigured modulator order is used in the first PUCCH, an addition reference signal may be transmitted in the first PUCCH which is overlapped.

The first PUCCH may be transmitted on multiple slots.

A reference signal of a same structure may be transmitted in each of the slots.

When the first PUCCH and the second PUCCH are overlapped, only the first PUCCH on the slot in which the overlap occurs may be not transmitted.

When the first PUCCH and the second PUCCH are overlapped, the first PUCCH may be not transmitted on all the multiple slots.

In another aspect, provided is a communication apparatus. The communication apparatus includes a transceiver configured to transmit and receive a wireless signal and a processor configured to operate with being connected to the transceiver. The processor is configured to: determine whether a first physical uplink control channel (PUCCH) and a second PUCCH are overlapped, and decide a transmission technique of the first PUCCH and the second PUCCH based on the determination, wherein the first PUCCH is an uplink control channel which is frequency division multiplexing (FDM) with a data channel, and the second PUCCH is an uplink control channel which is time division multiplexing (TDM) with the data channel.

According to the present invention, in NR in which uplink control channels of different types are introduced, in the case that collision or overlap occurs between uplink control channels, or collision or overlap occurs between each of the uplink control channels and data channel or SRS, and the like, a method of dealing with it is regulated, and accordingly, it may be prevented occurrence of ambiguity in uplink control channel transmission.

BRIEF DESCRIPTION OF THE DRAWINGS

FIG. 17 illustrates a multiple slot LGD_PUCCH which may be introduced in NR.

DESCRIPTION OF EXEMPLARY
EMBODIMENTS

Figure 1:
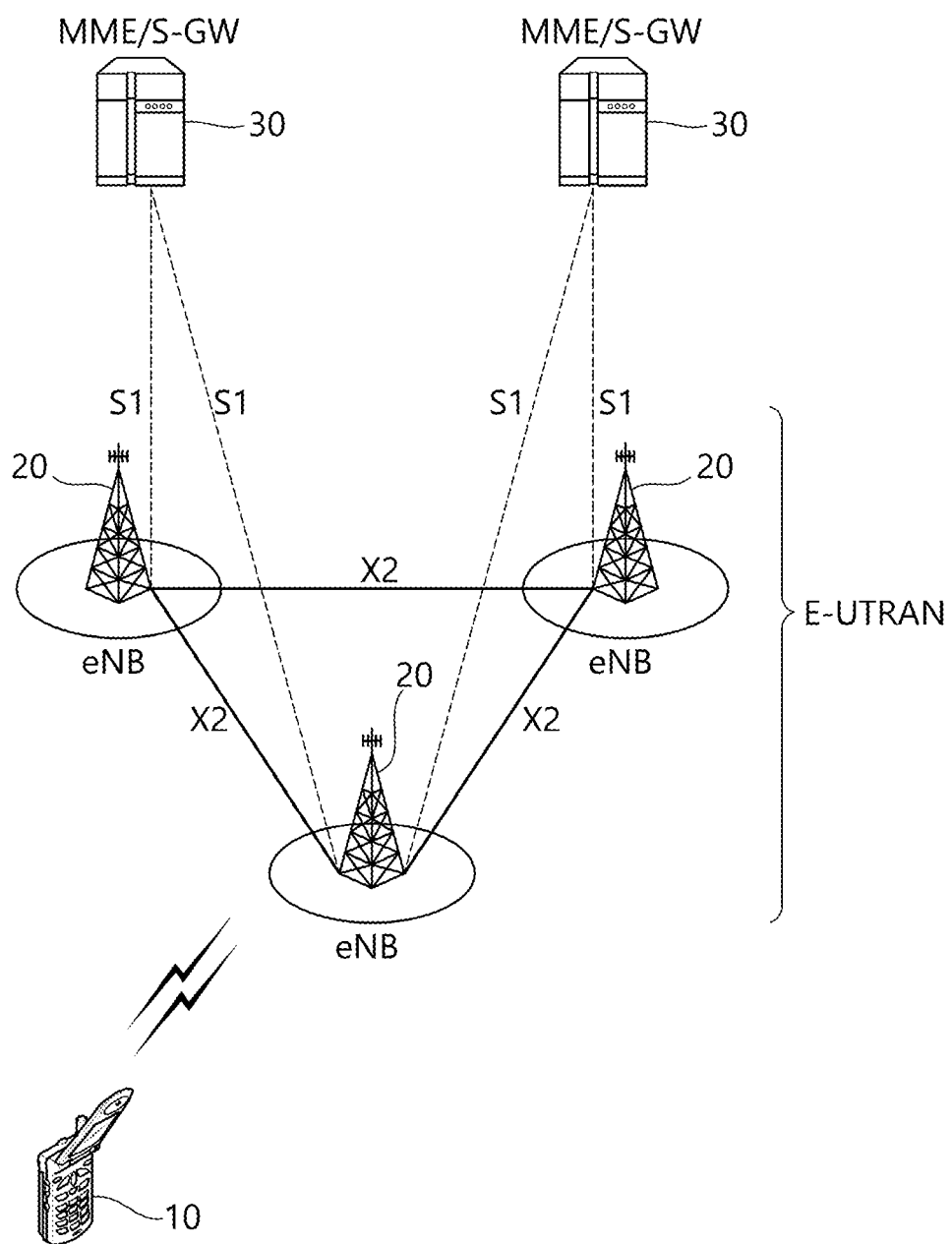
FIG. 1 illustrates a wireless communication system to which the present invention can be applied.

FIG. 1 shows a wireless communication system to which the present invention can be applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
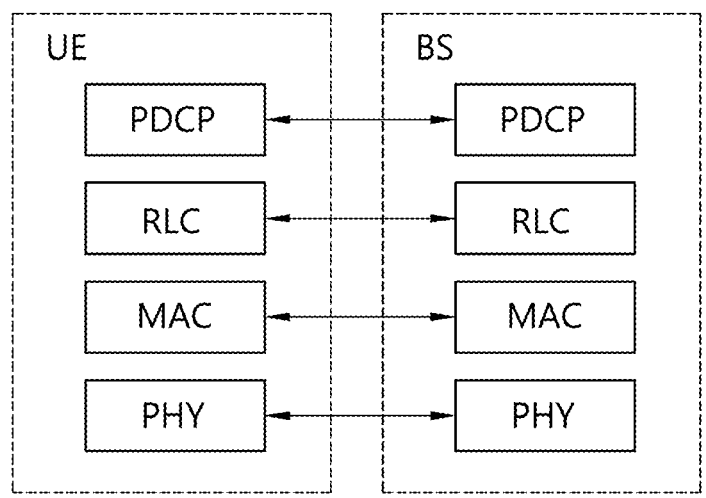
FIG. 2 is a block diagram showing the structure of a radio protocol on the user plane.
Figure 3:
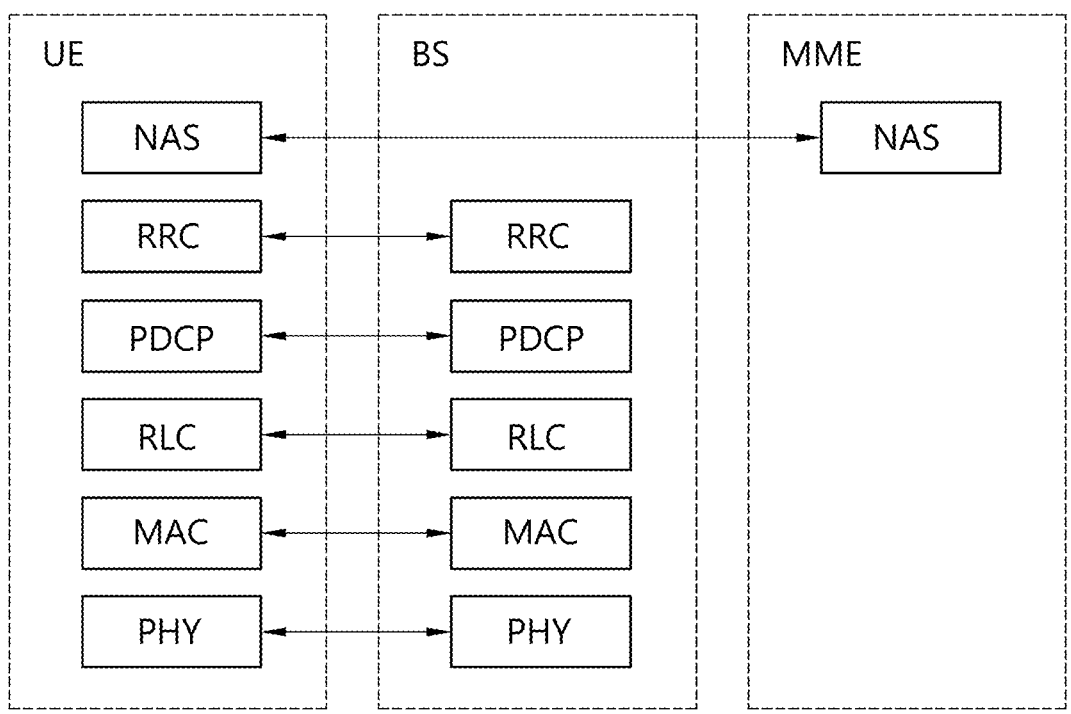
FIG. 3 is a block diagram showing the structure of a radio protocol on the control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a process of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

Hereinafter, new radio access technology (new RAT) will be described.

As more communication devices have demanded higher communication capacity, there has been increasing necessity for enhanced mobile broadband communication relative to the conventional radio access technology (RAT). In addition, the massive machine type communication (MTC) is also one of the main issues to be considered in the next generation communication, which provides various services irrespective of time and place by connecting a plurality of devices and objects to each other. Further, a communication system design in which service/UE sensitive to reliability and latency is considered has been under discussion. An introduction of the next generation radio access technology has been discussed, which takes into consideration of enhanced mobile broadband communication, massive MTC, ultra-reliable and low-latency communication (URLLC), and the like, and the corresponding technology is referred to as new RAT or NR, for the convenience of description.

Figure 4:
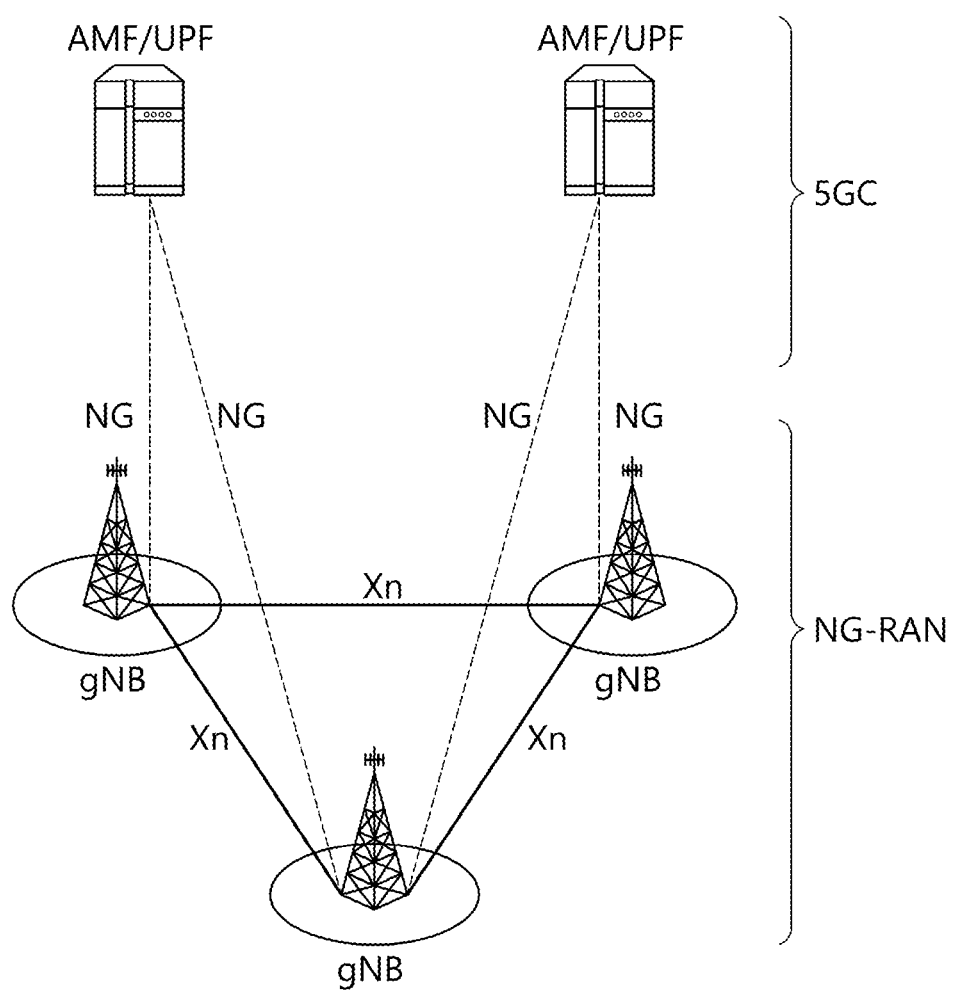
FIG. 4 illustrates system architecture of a next-generation radio access network (NG-RAN) to which NR is applied.

FIG. 4 illustrates system architecture of a next-generation radio access network (NG-RAN) to which NR is applied.

Referring to FIG. 4, the NG-RAN may include a gNB and/or an eNB which provides a UE with user plane and control plane protocol termination. FIG. 4 illustrates a case where only eNB is included. The gNBs and the eNBs are interconnected through an Xn interface. The gNB and the eNB are connected to a 5G core network (5GC) through NG interfaces. More specifically, the gNB and the eNB are connected to an access and mobility management function (AMF) through an NG-C interface and connected to a user plane function (UPF) through an NG-U interface.

Figure 5:
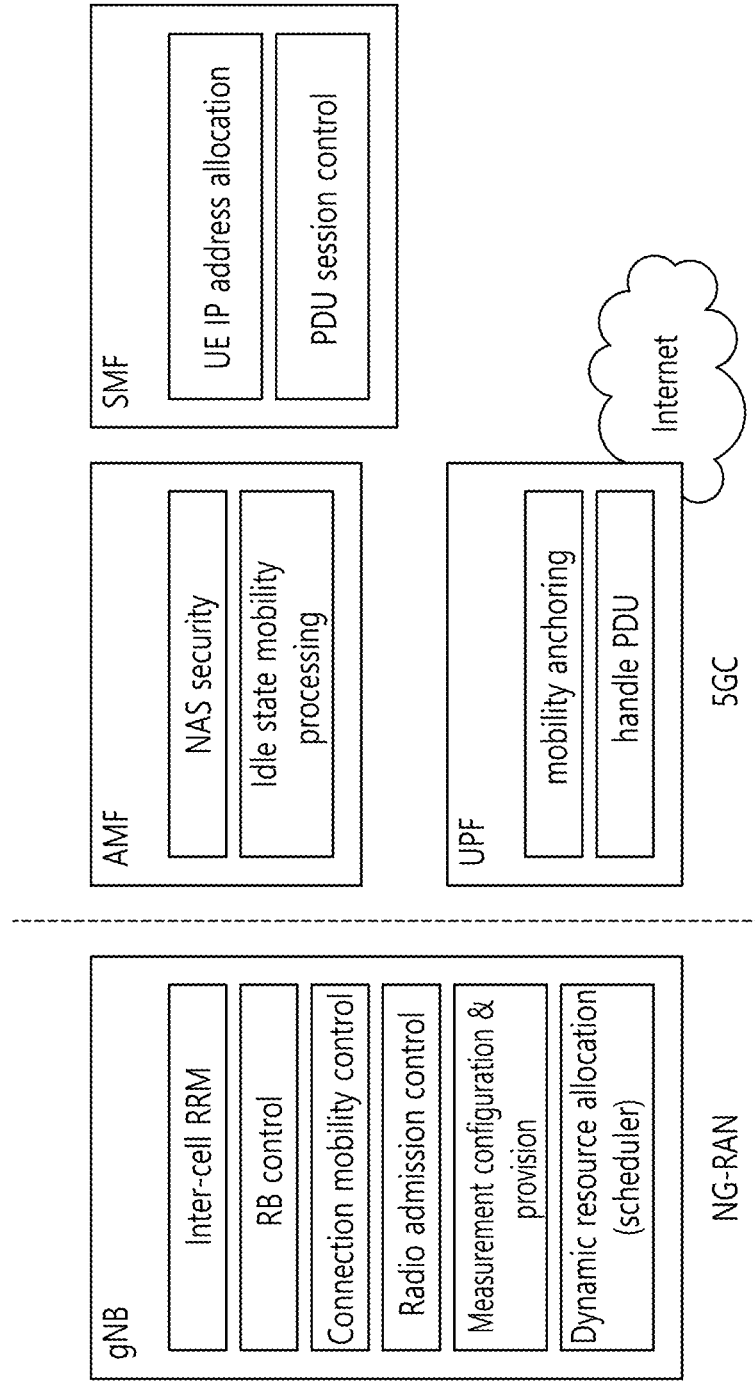
FIG. 5 illustrates function division between the NG-RAN and the 5GC.

FIG. 5 illustrates function division between the NG-RAN and the 5GC.

Referring to FIG. 5, a gNB may provide functions of inter-cell radio resource management (inter cell RRM), RB control, connection mobility control, radio admission control, measurement configuration & provision, dynamic resource allocation, and the like. The AMF may provide functions of NAS security, idle state mobility processing, and the like. The UPF may provide functions of mobility anchoring, PDU processing, and the like. A session management function (SMF) may provide functions of UE IP address allocation, PDU session control, and the like.

In the NR, the following technical/characteristic may be applied.

<Self-Contained Subframe Structure>

Figure 6:
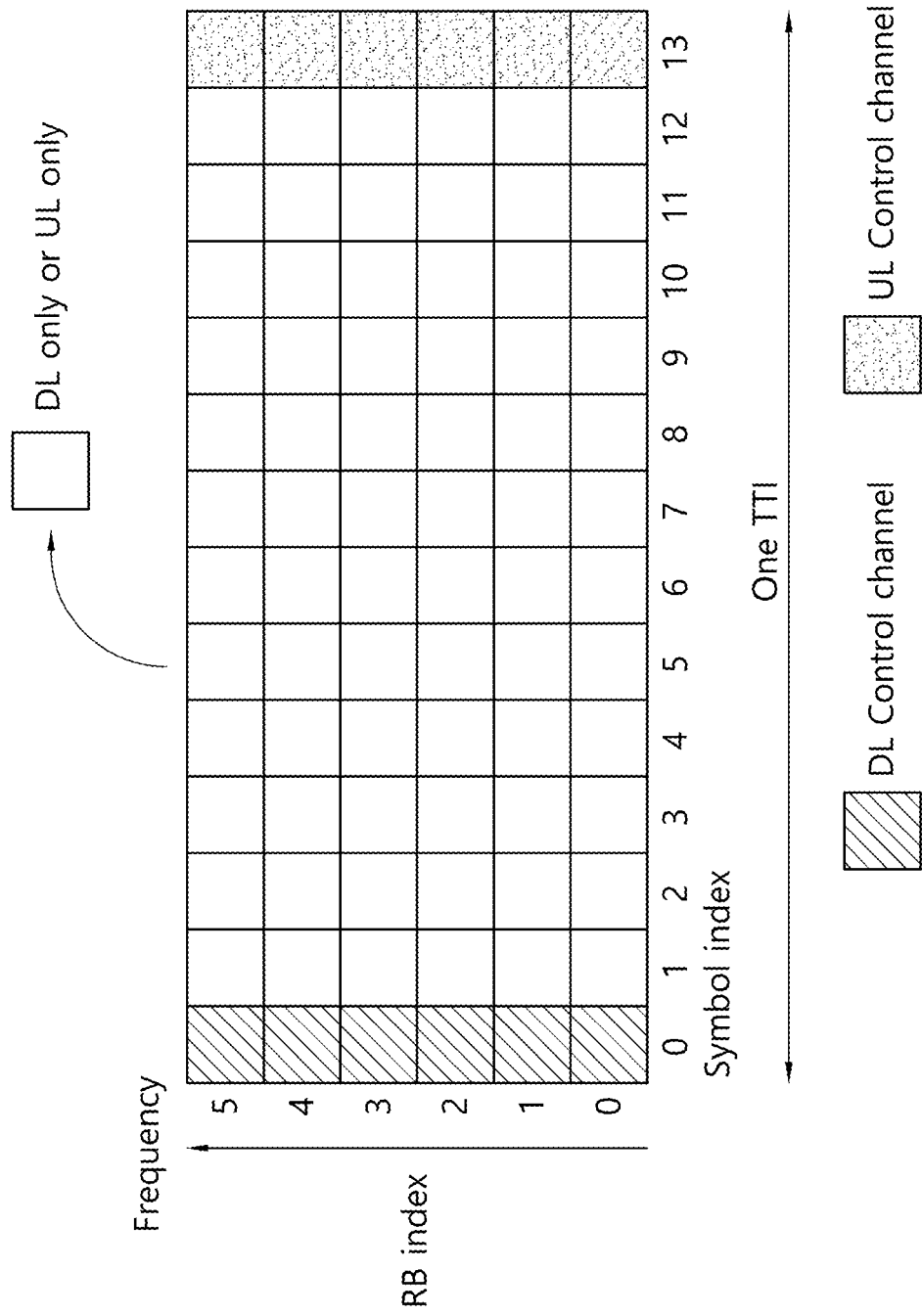
FIG. 6 shows an example of the frame structure for the new radio access technology.

FIG. 6 shows an example of the frame structure for the new radio access technology.

In the NR, a structure in which a control channel and a data channel are time division multiplexing (TDM) in one TTI, as shown in FIG. 6, may be considered as one of frame structures to minimize latency.

In FIG. 6, the shadow area represents downlink control region and the dark area represents uplink control region. The remaining area may also be used for downlink (DL) data transmission or uplink (UL) data transmission. The structure is characterized in that, the DL transmission and UL transmission are sequentially performed in a subframe, therefore may send DL data and receive UL ACK/NACK even in a subframe. Consequently, the time consumed until data retransmission is reduced when data transmission error occurs, thereby minimizing the latency of the final data transmission.

In such a self-contained subframe structure, a time gap may be required for the switching process from a transmission mode to a reception mode or the switching process from a reception mode to a transmission mode between an eNB and a UE. For this reason, a part of OFDM symbol on the time of switching from DL to UL may be set as a gourd period (GP) in the self-contained the subframe structure.

Meanwhile, in relation to uplink in NR, the following techniques may be applied.

<PUCCH Format in NR>

In NR, a PUCCH may be used for transmitting uplink control information (UCI). The PUCCH format may be distinguished by duration/payload size. For example, the PUCCH format may be distinguished into "SHORT DURATION UPLINK CONTROL CHANNEL (SHD_PUCCH)" and "LONG DURATION UPLINK CONTROL CHANNEL (LGD_PUCCH)". The SHD_PUCCH may be referred to as a short PUCCH for the convenience of description, format 0 (≤≤2 bits) and format 2 (>2 bits) may correspond thereto. The LGD_PUCCH may be referred to as a long PUCCH, and the long PUCCH may correspond to format 1 (≤≤2 bits), format 3 (>2, [>N] bits) and format 4 (>2, [≤≤N] bits).

Meanwhile, the transport diversity technique for a PUCCH may not be supported in LTE Rel-15. In addition, a simultaneous transmission of a PUSCH and a PUCCH of a UE may also not be supported in LTE Rel-15.

The PUCCH format in NR may be defined as represented in Table 1 below.

TABLE 1

| Format | PUCCH length (Number of OFDM symbols) | Number of bits | Use example | Note |
|---|---|---|---|---|
| 0 | 1-2 | ≤2 | HARQ, SR | Sequence selection |
| 1 | 4-14 | ≤2 | HARQ, [SR] | Sequence modulation (BPSK, QPSK) |
| 2 | 1-2 | >2 | HARQ, CSI, [SR] | [CP-OFDM] |
| 3 | 4-14 | [>N] | HARQ, CSI, [SR] | DFT-s-OFDM (no UE multiplexing) |
| 4 | 4-14 | >2, [≤N] | HARQ, CSI, [SR] | DFT-s-OFDM (Pre DFT OCC) |

<UL Signal/Channel Multiplexing>

For multiplexing a PUCCH and a PUSCH, the following technique may be supported. 1) time division multiplexing (TDM) between the short PUCCH (e.g., format 0/2) and the PUSCH, 2) frequency division multiplexing (FDM) between the short PUCCH for a slot having a single short UL-part of a UE (not Rel-15) (e.g., format 0/2) and the PUSCH.

For multiplexing a PUCCH and a PUSCH, the following technique may be supported.

1) TDM/FDM between the short PUCCH (e.g., format 0/2) and the long PUCCH (e.g., format 1/3/4) of different UEs.

2) TDM between the short PUCCHs (e.g., format 0/2) of the same slot of a single UE.

3) TDM between the short PUCCH (e.g., format 0/2) and the long PUCCH (e.g., format 1/3/4) of the same slot of a single UE.

Figure 7:
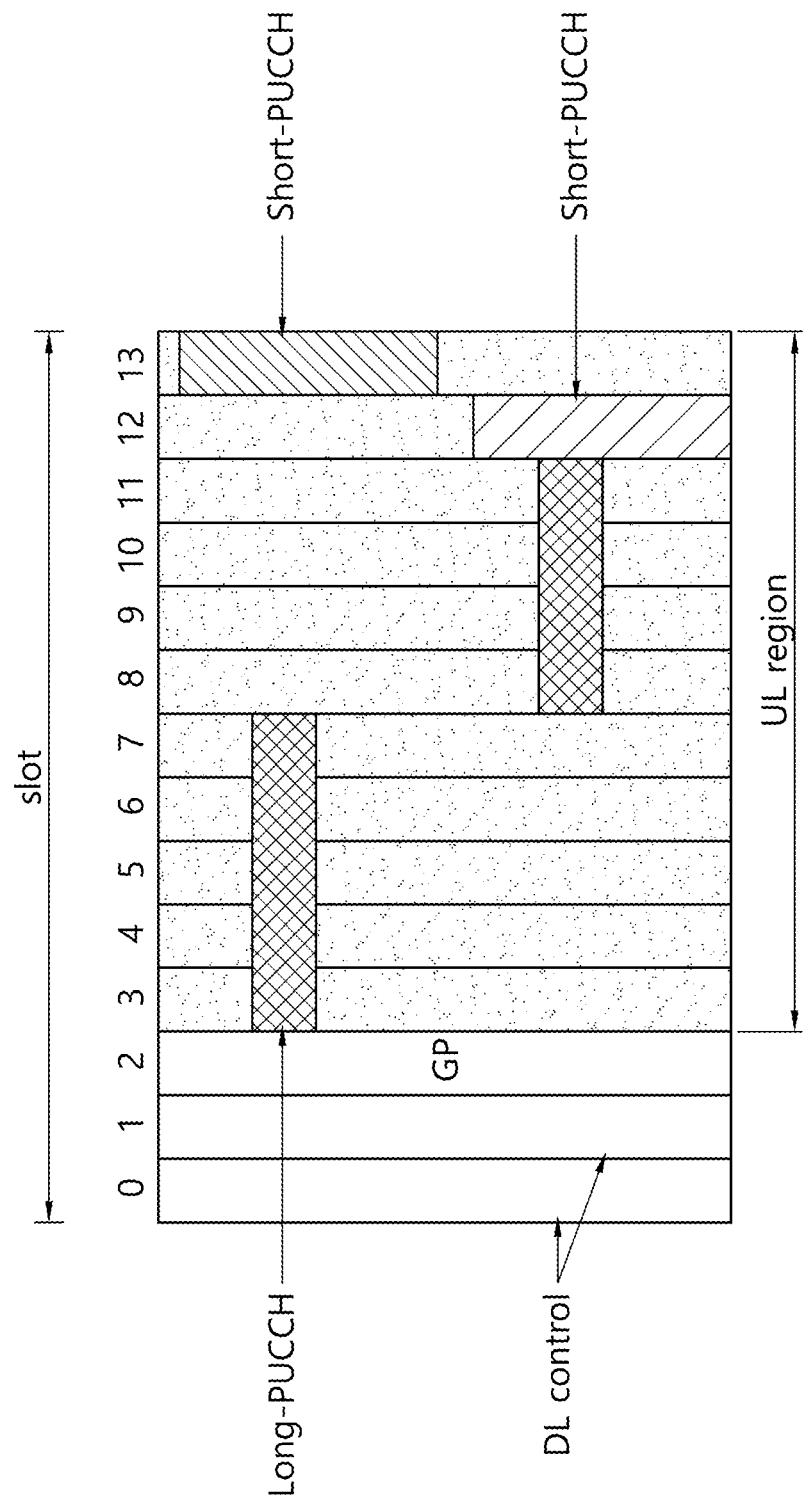
FIG. 7 illustrates an example of UL control channel multiplexing in NR.

FIG. 7 illustrates an example of UL control channel multiplexing in NR.

FIG. 7 shows an example, in a single slot, that the long PUCCHs are located from symbol #3 to #7 and from #8 to #11 on different frequency bands in a UL region. Further, FIG. 7 shows an example that the short PUCCHs are located on symbol #12 and #13, respectively. That is, it is shown the example that TDM is performed between the short PUCCHs and TDM/FDM is performed between the short PUCCH and the long PUCCH.

<Modulation and Coding Scheme (MCS) Offset>

In NR, both of semi-static and dynamic indications may be supported for beta-offset. For the semi-static and dynamic indications, sets of a plurality of beta-offset values may be configured by RRC signaling, and a UL grant may indicate an index for a single set dynamically among the sets. Each of the sets may include a plurality of entries, and each of the entries may correspond to each of UCI types (included, in the case that two-part CSI is applicable.).

<UCI Mapping>

For slot-based scheduling, 1) for HARQ-ACK more than 2 bits, a PUSCH may be rate-matched. 2) For HARQ-ACK of 2 bits or less, a PUSCH may be punctured.

In NR, the case may not be supported that a DL assignment behind a UL grant mapped to the same time instance for HARQ-ACK transmission on a PUSCH.

In addition, the UCI piggybacked on a PUSCH (e.g., HARQ-ACK or CSI) may be mapped to REs which are disposed in distributed manner throughout RBs assigned to a PUSCH.

Without regard to HARQ-ACK puncturing or PUSCH rate-matching, the same RE mapping rule may be applied to the HARQ-ACK piggyback on a PUSCH. For example, REs may be mapped in localized manner adjacent to DM-RS or mapped in distributed manner on a time domain.

<Scheduling/HARQ Timing>

Dynamic Indication for Scheduling/HARQ Timing.

A slot timing between A and B may be indicated by a field in DCI from a set of a series of values, and the set of a series of values may be configured by a UE-specific RRC signaling.

All Rel-15 UEs may support a minimum value of K0 like 0.

The K0 to K2 for the A and the B may be defined as represented in Table 2 below.

TABLE 2

| | A | B |
|---|---|---|
| K0 | DL scheduling DCI | Transmit corresponding DL data |
| K1 | Receive DL data | Corresponding HARQ-ACK |
| K2 | UL scheduling DCI | Transmit corresponding UL data |

UE processing time capability may be represented by a sign (N1, N2). Here, N1 may mean the number of OFDM symbols required for a UE processing, from a termination of NR-PDSCH reception, in an aspect of UE, to an available earliest start of the corresponding ACK/NACK transmission. N2 may mean the number of OFDM symbols required for a UE processing, from a termination of NR-PDCCH reception, in an aspect of UE, to an available earliest start of the corresponding NR-PUSCH transmission.

The minimum value of (K1, K2) of a UE may be decided by (N1, N2), timing advance value (TA value), UE DL/UL switching, and the like.

Meanwhile, in NR, two types of UE processing time capability may be defined for slot-based scheduling of non-CA case that uses at least a single numerology for PDCCH, PDSCH and PUSCH.

For example, for a given configuration and numerology, a UE may indicate only one capability for N1 (or N2) based on the corresponding N1 (or N2) entry from two Tables (Table 3 and Table 4) below.

Capability #1 (Table 3): UE processing time capability

TABLE 3

| Configuration | HARQ timing parameter | Unit | 15 kHz SCS | 30 kHz SCS | 60 kHz SCS | 120 kHz SCS |
|---|---|---|---|---|---|---|
| Front-loaded DMRS only | N1 | Symbols | [8] | [10] | [14] | [14-21] |
| Front-loaded + additional DMRS | N1 | Symbols | [13] | [13] | [17] | [21] |
| Frequency-first RE-mapping | N2 | Symbols | [9] | [11] | [17] | [31] |

Capability #2 (Table 4): Active UE processing time capability

TABLE 4

| Configuration | HARQ timing parameter | Unit | 15 kHz SCS | 30 kHz SCS |
|---|---|---|---|---|
| Front-loaded DMRS only | N1 | Symbols | [2.5-4] | [2.5-6] |
| Front-loaded + additional DMRS | N1 | Symbols | [12] | [12] |
| Frequency-first RE-mapping | N2 | Symbols | [2.5-6] | [2.5-6] |

<Hybrid Numerology and Scheduling/HARQ Timing>

When numerologies between transmissions scheduled by a PDCCH and a PDCCH are different, for K0 or K2, time granularity indicated in DCI may be based on the numerology of the scheduled transmission.

It may be supported HARQ-ACK transmission in relation to a plurality of DL component carriers operating in the same or different numerology. The time granularity for k1 indicated in DCI that schedules a PDSCH may be based on the numerology of a PUCCH transmission.

<Code Block Group (CBG) Based (Re)Transmission>

Synchronization: partial transport block (TB) retransmission may induce an efficient resource application. A unit of retransmission may be code block (CB) group (CBG). However, when this method is used, HARQ-ACK feedback bit and DCI overhead may be increased.

CBG configuration: A UE may be configured semi-statically such that a retransmission based on CBG is available by RRC signaling, and the configuration may be distinguished for DL and UL. Maximum value N of CBG per TB may be set by RRC signaling. In the case of a single codeword (CW), the configurable maximum value of CGB per TB may be 8. In the case of multiple CWs, the configurable maximum value of CGB per TB may be 4 and the configured maximum value of CGB per TB may be same for each TB.

In the case at least a single CW, the number M of CBGs in a TB may be equal to min (C, N), herein, C may be the number of CBs in the TB. The first Mod (C, M) among total M CBGs may include ceil (C/M) CB per CBG. The remaining M-Mod (C, M) CBG may include floor (C/M) CB per CBG.

In relation to DCI, CBG transmission information (CBGTI) and CBG flushing out information (CBGFI) may be introduced. CBGTI: CBG may be (re)transmitted and may be N bits of the CBGTI set by RRC. CBGFI: CBG may be differently processed for soft-buffer/HARQ combining, and different 1 bit for the CBGFI (in the case of at least a single CW).

With respect to DL data, the CBGTI and the CBGFI may be included in the same DCI. In mode 1, the DCI may include the CBGTI. In mode 2, the DCI may include the CBGTI and the CBGFI.

With respect to UL data, the CBGTI may be configured to be included in DCI. In mode 1, the DCI may include the CBGTI.

In HARQ-ACK feedback, for an initial transmission and a retransmission, there may be a set of the same CB(s) in each CBG of a TB. When a retransmission based on CBG is set, a UE may use TB level HARQ-ACK feedback in the case that at least HARQ-ACK multiplexing is not existed, with respect to a PDSCH scheduled by a PDCCH that uses fallback DCI. This may mean that the fallback DCI does not support CBG level HARQ-ACK feedback.

For the semi-static HARQ-ACK codebook, the HARQ-ACK codebook may include HARQ-ACK corresponding to all configured CBGs (including CBG which is not scheduled). In the case that the same CBG is successfully decoded, ACK may be reported for CBG. In the case that TB CRC check is not passed while CB CRC check is passed for all CBs, NACK may be reported for all CBGs. In the case that the number of CBs for a TB is smaller than the configured maximum number of the CBG, NACK may be mapped to empty CBG index.

Now, the present invention will be described.

When overlap occurs between SHORT DURATION UPLINK CONTROL CHANNEL (SHD_PUCCH)" and "LONG DURATION UPLINK CONTROL CHANNEL (LGD_PUCCH)" under a new radio access system (this may be referred to as new RAT or NR in the meaning of new radio), the following proposed methods may be related to a method for processing it efficiently.

Figure 8:
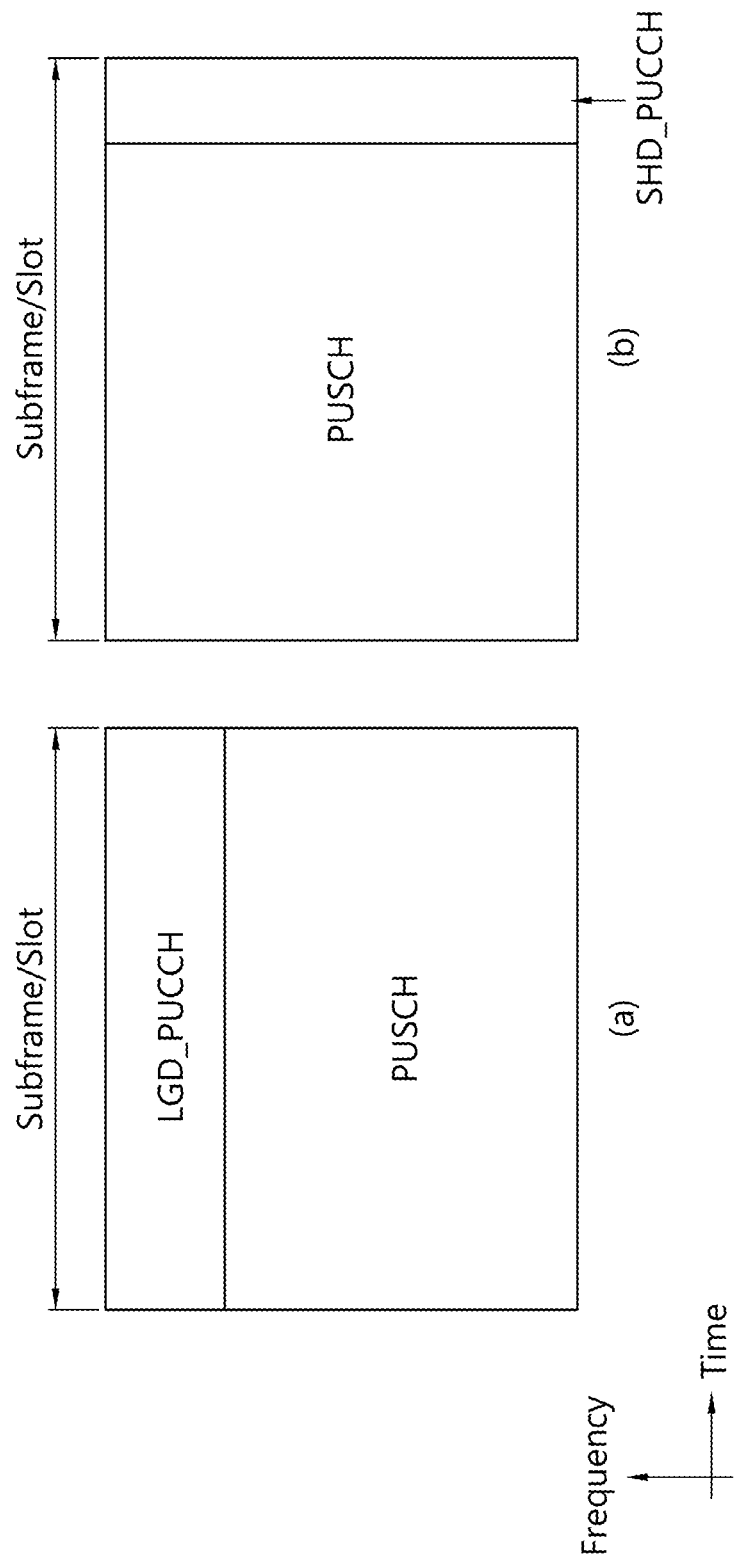
FIG. 8 illustrates LGD_PUCCH and SHD_PUCCH.

FIG. 8 illustrates LGD_PUCCH and SHD_PUCCH.

Referring to FIG. 8(a), "LGD_PUCCH (or LONG PUCCH)" means a PUCCH transmitted with being "frequency division multiplexing (FDM)" with a physical uplink shared channel (PUSCH) while occupying total symbols or the remaining symbols except a predetermined number of symbols of a specific position (e.g., the last position) in the time domain in a specific time unit (e.g., SUBFRME or SLOT). Herein, the PUSCH means an uplink data channel.

Referring to FIG. 8(b), "SHD_PUCCH (or SHORT PUCCH)" means a PUCCH transmitted with being "time division multiplexing (TDM)" with a PUSCH while occupying a predetermined number of symbols of a specific position (e.g., the last symbol) in the time domain in a specific time unit (e.g., SUBFRME or SLOT).

The LGD_PUCCH may be used for transmitting relatively large amount of information, and the SHD_PUCCH may be used for transmitting relatively small amount of information. The LGD_PUCCH and the SHD_PUCCH may be selected properly considering whether it is located on a feedback requested time/cell boundary.

Figure 9:
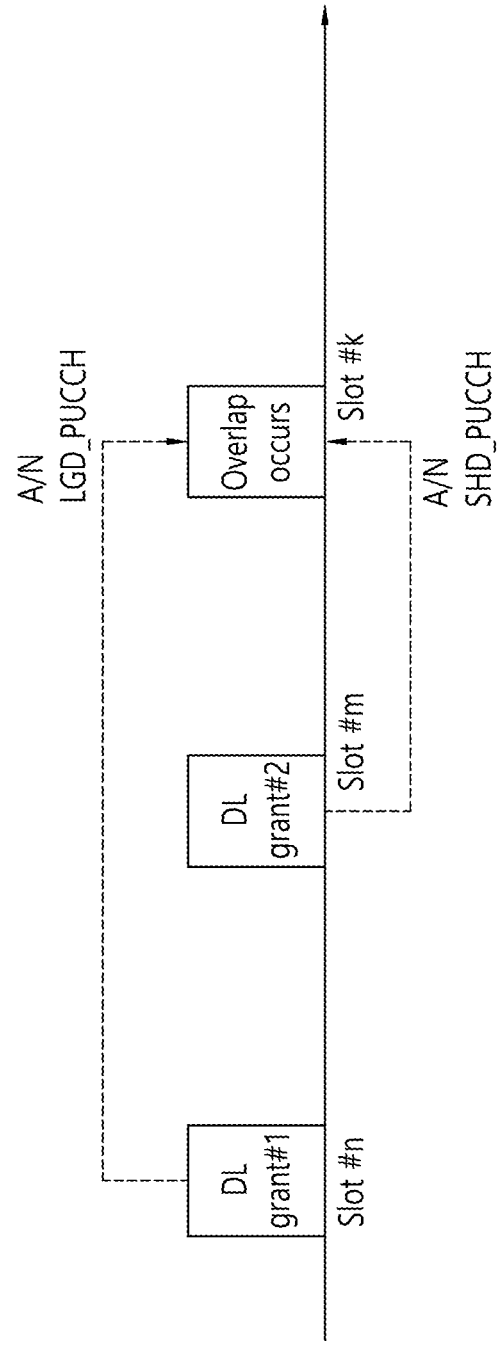
FIG. 9 illustrates the case that the LGD_PUCCH and the SHD_PUCCH are overlapped.

FIG. 9 illustrates the case that the LGD_PUCCH and the SHD_PUCCH are overlapped.

Referring to FIG. 9, a UE may receive DL grant #1 on slot #n and receive DL grant #2 on slot #m. For example, the UE may have to receive data scheduled by DL grant #1 on slot #n and transmit ACK/NACK for the data on slot #k. In this case, the UE may be configured to transmit ACK/NACK using the LGH_PUCCH. In addition, the UE may have to receive data scheduled by DL grant #2 on slot #m and transmit ACK/NACK for the data on slot #k. In this case, since the ACK/NACK transmission timing is short, the UE may be configured to transmit ACK/NACK using the SHD_PUCCH instead of the LGH_PUCCH.

In this case, transmissions of the LGH_PUCCH and the SHD_PUCCH are scheduled on the same slot, and this may be represented as the LGH_PUCCH and the SHD_PUCCH are overlapped.

In the present invention, the term "overlap" may be interpreted as (A) the case that actual "(frequency) resource" is (wholly or partially) overlapped between the SHD_PUCCH and the LGH_PUCCH and/or (B) the case that transmissions of "(frequency) resource" is not overlapped, but two channels (/signals) are configured on the same symbol.

The term "SHD_PUCCH" may be (extendedly) interpreted (/(mutually) substituted) to/by "SRS (or "PUSCH")".

And/or the term "LGH_PUCCH" may be (extendedly) interpreted (/(mutually) substituted) to/by "PUSCH (or "SRS")".

In such a case, the same or different proposed method described in the present invention may be applied to each of the four combinations (e.g., "SHD_PUCCH and LGD_PUCCH", "SHD_PUCCH and PUSCH (or SRS)", "LGD_PUCCH and SRS (or PUSCH)" and "PUSCH and SRS"). In the present invention, the term "puncturing (or "rate matching") may be (mutually) substituted by "rate matching (or "puncturing")". In the present invention, the term "SLOT (or "SUBFRAME")" may be (mutually) substituted by "SUBFRAME (or "SLOT")".

Now, in the case that the LGH_PUCCH and the SHD_PUCCH are overlapped, the scheme of processing it will be described in detail.

Figure 10:
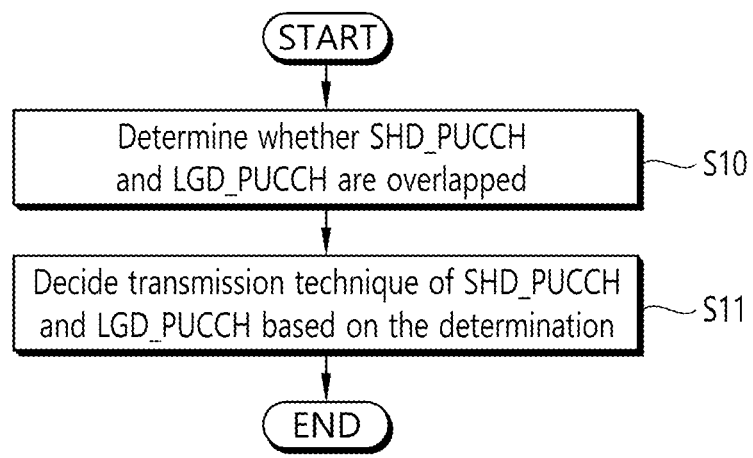
FIG. 10 illustrates a method for transmitting UL control channel according to an embodiment of the present invention.

FIG. 10 illustrates a method for transmitting UL control channel according to an embodiment of the present invention.

Referring to FIG. 10, a UE may determine whether a first physical uplink control channel (PUCCH) and a second PUCCH are overlapped (step, S10) and decide a transmission technique of the first PUCCH and the second PUCCH based on the determination (step, S11). The first PUCCH may be the LGD_PUCCH described above and the second PUCCH may be the SHD_PUCCH described above. That is, the first PUCCH may be a UL control channel which is frequency division multiplexing (FDM) with a data channel and the second PUCCH may be a UL control channel which is time division multiplexing (TDM) with the data channel.

[Proposed method #1-1] As an example, "time gap (this is referred to as DRUT_TINTERVAL)" between "a reception time of DL GRANT" and "a transmission time of (interlinked) SHD_PUCCH" is greater than or equal to "(minimum UL control information processing time" of the SHD_PUCCH (and/or a minimum processing time required for piggybacking the LGD_PUCCH (or PUSCH) of the SHD_PUCCH) (this is referred to as MIN_REQTB), it may be configured to piggyback the SHD_PUCCH to the LGD_PUCCH (or PUSCH). Otherwise (e.g., in the case that the DRUT_TINTERVAL is smaller than the MIN_REQTB), it may be configured to piggyback the LGD_PUCCH to the SHD_PUCCH.

Figure 11:
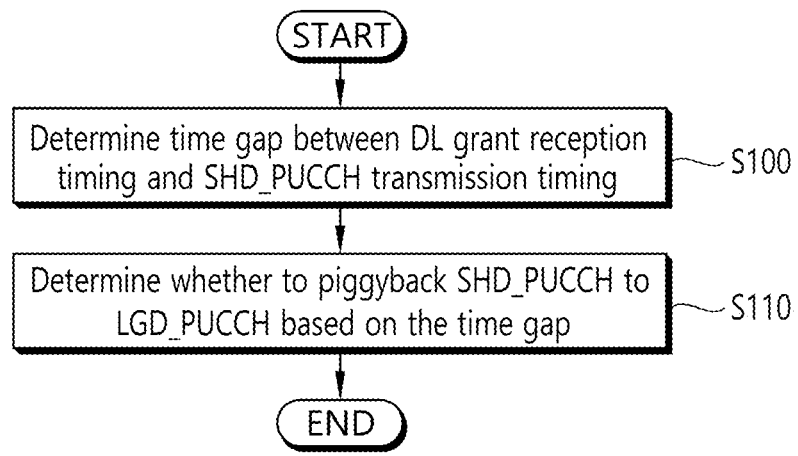
FIG. 11 illustrates a method for transmitting UL control channel according to proposed method #1-1.

FIG. 11 illustrates a method for transmitting UL control channel according to proposed method #1-1.

Referring to FIG. 11, a UE may determine a time gap between a reception timing of a DL grant and a transmission timing of the SHD_PUCCH (step, S100), and based on the time gap, determine whether to piggyback the SHD_PUCCH to the LGD_PUCCH (step, S110).

At this time, (A) the amount of information of the LGD_PUCCH piggybacked to the SHD_PUCCH and/or (B) whether the LGD_PUCCH is piggybacked to the SHD_PUCCH (finally), may be different according to the (maximum) payload size of the SHD_PUCCH.

As an example, in the case that the (maximum) payload size of the SHD_PUCCH is smaller than a threshold value which is preconfigured/signaled in advance, the LGD_PUCCH may not be piggybacked to the SHD_PUCCH. In such case, the LGD_PUCCH may be punctured in the "resource element (and/or resource block and/or sequence and/or symbol)" level (considering SHD_PUCCH (region)) and/or a (transmission) of the LGD_PUCCH (or the SHD_PUCCH) may be "dropped (or "stopped")".

As another example, in the case that the PUSCH (or the LGD_PUCCH) and the SHD_PUCCH are "TDM" (transmitted/scheduled) (on the same slot) and an operation is configured to transmit UCI to which a transmission to the SHD_PUCCH is configured (transmitted/scheduled) according to a predefined rule by piggybacking with the PUSCH (or the LGD_PUCCH), a UE may operate to perform a transmission to the SHD_PUCCH according to what is configured (/indicated) originally, in addition to transmit the corresponding UCI to which a transmission to the SHD_PUCCH is configured (/indicated) by piggybacking with the PUSCH (or LGD_PUCCH).

That is, in the situation, the UCI to which a transmission to the SHD_PUCCH is configured (/indicated) may be transmitted through both the PUSCH (or the LGD_PUCCH) and the SHD_PUCCH which is "TDM" in the same slot. In the case that such a rule is applied, the UCI to which a transmission to the SHD_PUCCH is configured (/indicated) is repeatedly transmitted, and the performance may be improved.

[Proposed method #1-2] The LGD_PUCCH (or PUSCH) may be punctured in "RESOURCE ELEMENT (RE) (and/or (physical) RESOURCE BLOCK (RB) and/or sequence (e.g., ZADOFF-CHU sequence) and/or symbol)" (considering the SHD_PUCCH (or SRS) (region)).

Particularly, for the (partially) remaining (the LGD_PUCCH (or PUSCH)) region after applying RESOURCE ELEMENT (and/or RESOURCE BLOCK and/or sequence level puncturing, the "partial DFT (e.g., L-POINT DFT spreading (e.g., "M>L"))" considering the remaining region may be applied.

Here, as an example, (when the SHD_PUCCH (or SRS) (e.g., ZADOFF-CHU sequence) (region) puncturing is performed on a frequency domain (R_FRQDOMAIN) after applying M-POINT DFT spreading) a resource position applying L-POINT DFT spreading which is (partially) remaining (or interlinked (/mapped) with/to the LGD_PUCCH (or PUSCH)) region) after applying (the SHD_PUCCH (or SRS) on R_FRQDOMAIN (region) puncturing may be identically configured (/signaled) with (A) (the LGD_PUCCH (or PUSCH) region (resource block (/resource element)) index (partially) remaining on R_FRQDOMAIN.

And/or (B) the resource position may be L (resource block (/resource element)) indices in a descending order (or ascending order) direction from MAX (or MIN) V_FRQDOMAIN (resource block (/resource element)), for example) position which is preconfigured (/signaled in advance) on V_FRQDOMAIN.

As an example, the number of (total) (resource block) resources to which L-POINT DFT spreading is applied may be defined as a value which can be represented as "$2X*3Y*5Z$ (herein, for example, X/Y/Z are non-zero positive integers)".

That is, in the case that resources of the LGD_PUCCH (or PUSCH) and the SHD_PUCCH (or SRS) are overlapped in the frequency domain, a method may be considered that DFT process (of reduced size) for the LGD_PUCCH (or PUSCH) information is performed with the size corresponding to the remaining resource except as much as the frequency which is overlapped in the symbol in which resource overlap occurs, an output signal of the corresponding DFT is mapped/transmitted (e.g., puncturing or rate matching) only to the LGD_PUCCH (or PUSCH) resource which is not overlapped with the SHD_PUCCH (or SRS) on the REAL FREQUENCY.

Figure 12:
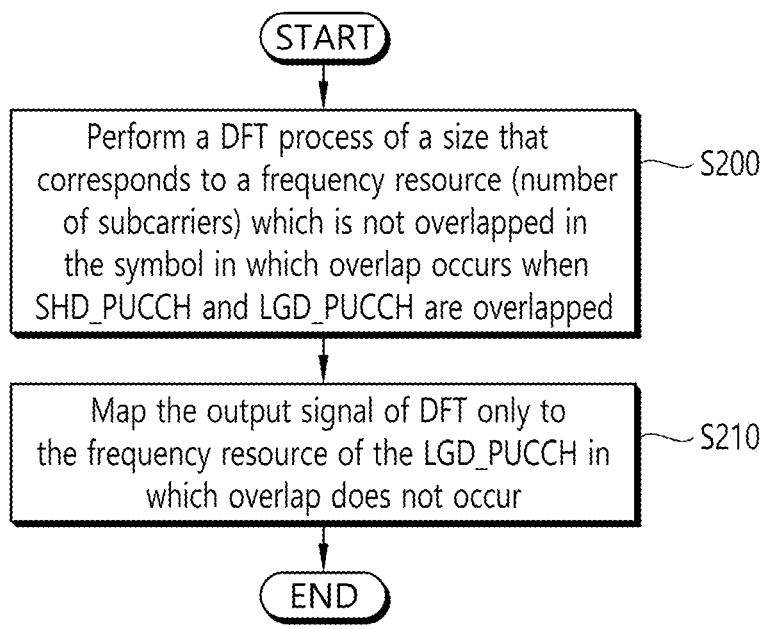
FIG. 12 illustrates an example of performing DFT of UL control channel.

FIG. 12 illustrates an example of performing DFT of UL control channel.

Referring to FIG. 12, in the case that the SHD_PUCCH and the LGD_PUCCH are overlapped, a UE performs a DFT process of a size that corresponds to a frequency resource (number of subcarriers) which is not overlapped in the symbol in which overlap occurs (step, S200). Thereafter, the UE may map the output signal of DFT only to the frequency resource of the LGD_PUCCH in which overlap does not occur (step, S210).

For example, in the case that the resource allocated to the LGD_PUCCH (or PUSCH) is M resource blocks and in the case that the resource overlapped with the SHD_PUCCH (or SRS) is K resource blocks (i.e., the resource which is not overlapped with the SHD_PUCCH (or SRS) is "L=(M−K)" resource blocks), DFT process of M resource block size may be performed for the LGD_PUCCH (or PUSCH) with respect to the symbol in which there is no overlap of frequency domain. On the other hand, with respect to the symbol in which there is overlap of frequency domain, DFT process of L resource block size may be performed for the LGD_PUCCH (or PUSCH).

As an example, the output signal of DFT of the corresponding L resource block size may be mapped/transmitted to L resource blocks in which there is no overlapped with the SHD_PUCCH (or SRS) among the resources assigned to the LGD_PUCCH (or PUSCH) on the REAL FREQUENCY At this time, in the case of L resource blocks which is an input of DFT on the VIRTUAL FREQUENCY, in the state that (A) it is determined to an index corresponding to the lowest or the highest L resource blocks on the VIRTUAL FREQUENCY index and/or (B) the VIRTUAL FREQUENCY and the REAL FREQUENCY are one-to-one corresponded in a descending order or an ascending order, the LGD_PUCCH (or PUSCH) signal may be determined to be the VIRTUAL FREQUENCY index of L resource blocks corresponding to the VIRTUAL FREQUENCY of the L resource blocks in which there is no overlap to be mapped/transmitted.

As another example, the SHD_PUCCH (or SRS) may be punctured in "resource element (and/or resource block and/or sequence and/or symbol)" level (considering the LGD_PUCCH (or PUSCH) (region)).

As an example, whether to (finally) apply the corresponding (SHD_PUCCH) puncturing may be changed according to "whether it is the SHD_PUCCH type (e.g., whether it is LOCALIZED SHD_PUCCH or DISTRIBUTED SHD_PUCCH, herein, the DISTRIBUTED SHD_PUCCH may be a format in which BASIC SEQUENCE UNIT is repeatedly transmitted (on the frequency axis))".

As a specific example, in the case of the LOCALIZED SHD_PUCCH, the LGD_PUCCH (or PUSCH) may be punctured (considering the SHD_PUCCH (region)) and on the other hand, in the case of the DISTRIBUTED SHD_PUCCH, the SHD_PUCCH may be punctured (considering the LGD_PUCCH (or PUSCH) (region)).

As another example, for multiplexing between the SHD_PUCCH (or SRS) and the LGD_PUCCH (or PUSCH) of different UEs, the rate matching (or puncturing) of "(UL control) sub band and/or symbol" level may be indicated "semi-statically" or "dynamically" (through a predefined signaling).

As another example, in the case that the PUSCH and the SHD_PUCCH are "overlapped" on the same slot, a rule applied to the PUSCH may be changed according to SHD_PUCCH symbol position (on the slot) (and/or the number of remaining PUSCH symbols after the last symbol position of the SHD_PUCCH (this is referred to as REMSYM_NUM).

Figure 13:
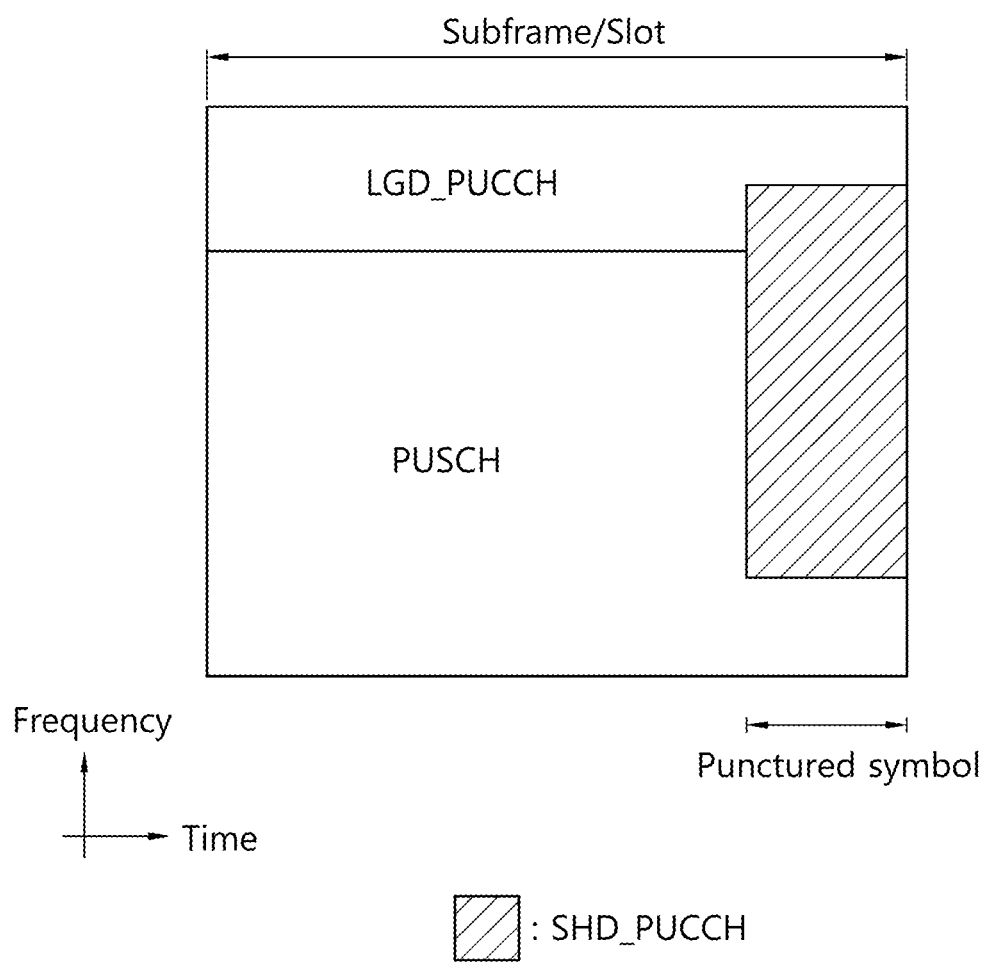
FIG. 13 illustrates a first example of puncturing the PUSCH according to a symbol position of the SHD_PUCCH in the case that he PUSCH and the SHD_PUCCH are "overlapped" on the same slot.

FIG. 13 illustrates a first example of puncturing the PUSCH according to a symbol position of the SHD_PUCCH in the case that he PUSCH and the SHD_PUCCH are "overlapped" on the same slot.

Referring to FIG. 13, the SHD_PUCCH is located on the last symbol on a slot (i.e., the number of remaining PUSCH symbols after the last symbol position of the SHD_PUCCH, that is, REMSYM_NUM is "0"), and in this case, only the PUSCH symbol overlapped with the SHD_PUCCH may be punctured in "resource element (and/or resource block and/or sequence and/or symbol)" level.

Figure 14:
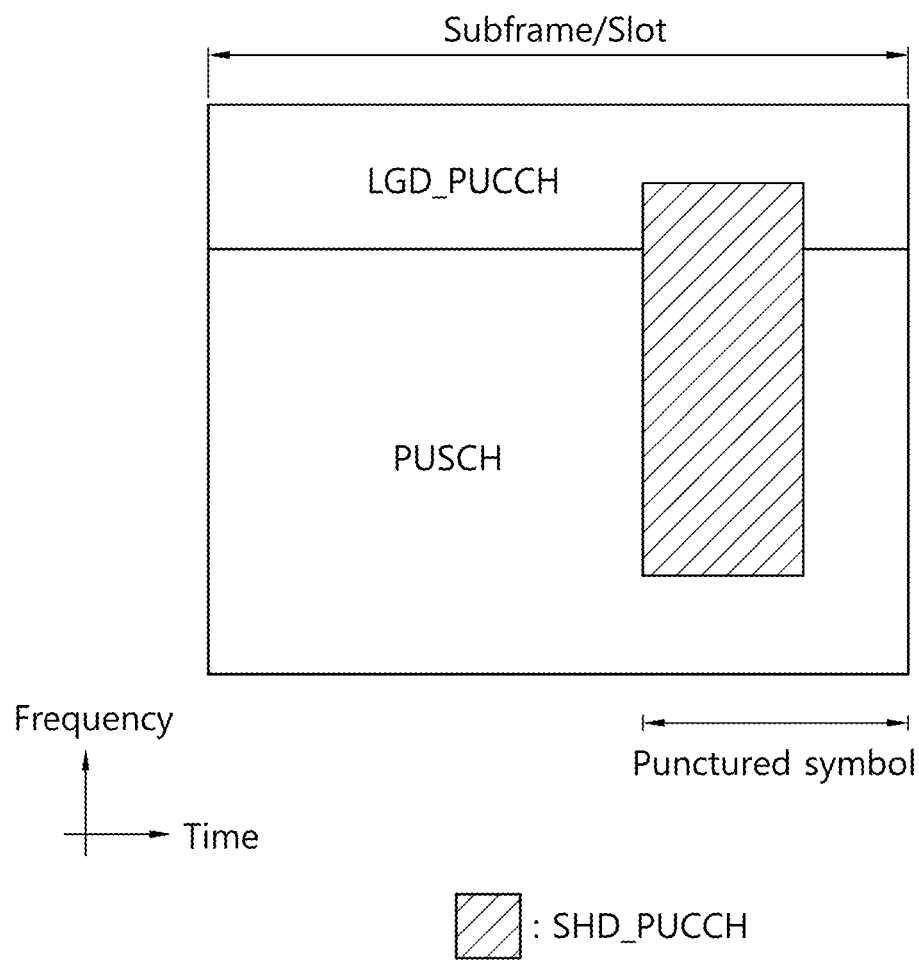
FIG. 14 illustrates a second example of puncturing the PUSCH according to a symbol position of the SHD_PUCCH in the case that he PUSCH and the SHD_PUCCH are "overlapped" on the same slot.

FIG. 14 illustrates a second example of puncturing the PUSCH according to a symbol position of the SHD_PUCCH in the case that he PUSCH and the SHD_PUCCH are "overlapped" on the same slot.

Referring to FIG. 14, the SHD_PUCCH is not located on the last symbol on a slot (i.e., located in the second symbol from the end position, i.e., the case that the number of PUSCH symbols remaining after the last symbol position of the SHD_PUCCH, REMSYM_NUM is not "0"), and in this case, (all) later PUSCH (symbol) transmission including the PUSCH symbol overlapped with the SHD_PUCCH may be omitted (and/or without regard to overlap, (entire) PUSCH transmissions are omitted).

As shown in FIGS. 13 and 14, in the case that the second PUCCH (SHD_PUCCH) and a data channel (PUSCH) are overlapped, the symbol punctured in the data channel may be differently determined according to the symbol on which the second PUCCH is located.

As another example, (resource) overlap processing rule between the SHD_PUCCH (or SRS) and the PUSCH (or LGD_PUCCH) may be changed according to PUSCH (or LGD_PUCCH) WAVEFORM.

As an example, (A) in the case that the PUSCH (or LGD_PUCCH) is "SC-FDM" or "DFT-S-OFDM" form, (considering the symbol on which the (overlapped) SHD_PUCCH (or SRS) is transmitted), it may operate such that the PUSCH (or LGD_PUCCH) is punctured with "symbol" level.

In such as case, the corresponding PUSCH (or LGD_PUCCH) signal may not be mapped/transmitted to the symbol on which the (overlapped) SHD_PUCCH (or SRS) is transmitted and may be mapped/transmitted only to the remaining symbol except the symbol among the assigned resources for the PUSCH (or LGD_PUCCH) transmission.

As another example, (B) in the case that the PUSCH (or LGD_PUCCH) is "OFDM" form, (considering the resource block (/resource element) on which the (overlapped) SHD_PUCCH (or SRS) is transmitted), it may operate such that the PUSCH (or LGD_PUCCH) is punctured with "resource block (/resource element)" level.

In such as case, the corresponding PUSCH (or LGD_PUCCH) signal may not be mapped/transmitted to the resource block (/resource element) on which the SHD_PUCCH (or SRS) signal is mapped/transmitted in the symbol on which the SHD_PUCCH (or SRS) is transmitted and may be mapped/transmitted only to the remaining symbol except the resource block (/resource element) (among the assigned resources for the PUSCH (or LGD_PUCCH) transmission).

[Proposed method #1-3] In the case that different channels are overlapped, a method of dropping/stopping any one channel is described.

Figure 15:
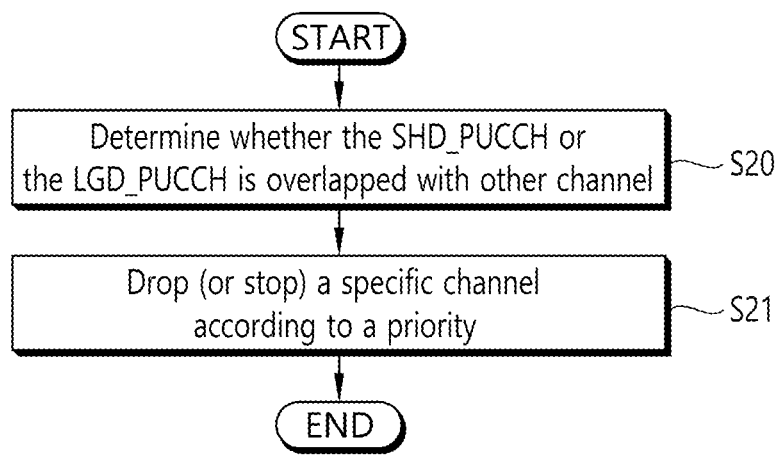
FIG. 15 illustrates a method according to proposed method #1-3.

FIG. 15 illustrates a method according to proposed method #1-3.

Referring to FIG. 15, it is determined whether the SHD_PUCCH or the LGD_PUCCH is overlapped with other channel (step, S20), and a specific channel is dropped (or stopped) according to a priority (step, S21). Hereinafter, proposed method #1-3 will be described in more detail.

In the case that the LGD_PUCCH (or PUSCH) and the SHD_PUCCH (or SRS) are overlapped, the LGD_PUCCH (or PUSCH) (or the SHD_PUCCH (or SRS)) may be "(transmission) dropped" (or "(transmission) stopped").

Here, "(transmission) stopped" may be interpreted as omitting only the transmission on a region on which "overlap" occurs and/or omitting (all) transmissions after transmission of the region on which "overlap" occurs.

As an example, "(transmission) stopped" of the LGD_PUCCH may be (limitedly) applied in the case that SHD_PUCCH (transmission) indication is detected after LGD_PUCCH (transmission) start. Here, depending on the time of detection, (A) it may be differently configured to apply between "(transmission) dropped" (not transmitting entire channels) and "(transmission) stopped" (stopped only on the overlapped region and transmitted on other regions). For example, the "(transmission) dropped" of the LGD_PUCCH may be applied in the case that the SHD_PUCCH (transmission) indication is detected before LGD_PUCCH (transmission) start and/or the "(transmission) stopped" of the SHD_PUCCH may be applied in the case that the SHD_PUCCH (transmission) indication is detected after LGD_PUCCH (transmission) start.

And/or (B) it may be differently configured to apply between "(transmission) stopped" and "puncturing". For example, the "puncturing (considering SHD_PUCCH (region))" of the LGD_PUCCH may be applied in the case that the SHD_PUCCH (transmission) indication is detected after LGD_PUCCH (transmission) start and/or the "puncturing (considering LGD_PUCCH (region))" of the SHD_PUCCH may be applied in the case that the SHD_PUCCH (transmission) indication is detected after LGD_PUCCH (transmission) start. And/or "(transmission) stopped" of the LGD_PUCCH may be applied in the case that the SHD_PUCCH (transmission) indication is detected before (/after) LGD_PUCCH (transmission) start.

As an example, in the case that "overlap" occurs between the SHD_PUCCH and the SRS (and/or the LGD_PUCCH and the PUSCH), the SRS (or the SHD_PUCCH) (and/or the PUSCH (or the LGD_PUCCH) may be "(transmission) dropped" (or "(transmission) stopped").

[Proposed method #1-4] Depending on channels (/signals) between which "overlap" occurs (e.g., between LGD_PUCCH, SHD_PUCCH, PUSCH and SRS), even it is the same channel (/signal), the applied rule (e.g., piggyback, puncturing, (transmission) dropped, (transmission) stopped, etc.) may be changed.

As an example, (A) in the case that "overlap" occurs between the SHD_PUCCH and the LGD_PUCCH, the LGD_PUCCH is punctured (considering SHD_PUCCH (region)), and (B) in the case that "overlap" occurs between the LGD_PUCCH and the SRS, the SRS may be (transmission) dropped (or the SRS is punctured (considering LGD_PUCCH (region)).

As an example, (in the case that "overlap" occurs between different channels (/signals)), the priority of applying puncturing (and/or (transmission) dropped and/or (transmission) stopped) may be defined as "SHD_PUCCH<SRS<LGD_PUCCH<PUSCH". Herein, the right position represents relatively high priority than the left position, and the channel (/signal) of relatively high priority may be punctured considering the channel (/signal) of relatively low priority.

As an example, it may be configured such that aperiodic channel (/signal) transmission has relatively low (or high) puncturing (and/or (transmission) dropped and/or (transmission) stopped) application priority than periodic channel/signal (e.g., "aperiodic CSI<aperiodic SRS<periodic CSI<periodic SRS").

The following proposed methods proposes a configuration method of "(power) TRANSIENT PERIOD)" per channel (/signal) under the NR system.

[Proposed method #2-1] As an example, the priority related to "(power) TRANSIENT PERIOD)" configuration may be defined (/signaled) as "SHD_PUCCH>SRS>LGD_PUCCH>PUSCH". Here, the right position represents relatively low priority than the left position, the "(power) TRANSIENT PERIOD)" related to the channel (/signal) of relatively low priority may be configured within the corresponding channel (/signal) (transmission) region (e.g., the first/the last symbol), and the "(power) TRANSIENT PERIOD)" related to the channel (/signal) of relatively high priority may be configured outside of the corresponding channel (/signal) (transmission) region.

As an example, "(power) TRANSIENT PERIOD)" may be differently configured depending on the number of (configuration) symbols and/or positions related to the channel (/signal).

The following proposed methods proposes a method of controlling/distributing transmission power efficiently when LGD_PUCCH (or PUSCH) transmission and SHD_PUCCH (or SRS) transmission is "overlapped" (e.g., "(frequency) resources" are not overlapped, but two channel transmission is (partially or wholly) overlapped (on the time domain)) under the NR system.

(A part of) the following methods may be limitedly applied only to "POWER LIMITED CASE". (A part of) the following methods may be extendedly applied even to the case that after the LGD_PUCCH (or PUSCH) transmission is (already) started, the SHD_PUCCH transmission through the same symbol(s) is indicated.

[Proposed method #3-1] Transmission power control/distribution may be performed in a unit of "PARTIAL SLOT" (e.g., "HALF SLOT") preconfigured (/signaled in advance).

Here, the "PARTIAL SLOT" may be designated (A) in a unit of UCI symbol set depending on a single DM-RS (channel estimation/decoding) and/or (B) in a unit of UCI symbol set to which CDM (or orthogonal cover code (OCC)) is applied. For example, in a unit of the (at least) "PARTIAL SLOT", a power transmission may be regularly maintained.

[Proposed method #3-2] In the case of not "POWER LIMITED CASE", a simultaneous transmission of ("overlapped") two channels is allowed, and on the other hand, in the case of "POWER LIMITED CASE", (A) the SHD_PUCCH (UCI) information may be piggybacked to the PUSCH (or LGD_PUCCH) and/or (B) the PUSCH (or LGD_PUCCH) may be punctured (considering SHD_PUCCH (region)) and/or (C) the PUSCH (or LGD_PUCCH) (or the SHD_PUCCH) may be (transmission) dropped (or (transmission) stopped).

In the case that the rule is applied, the PUSCH (or LGD_PUCCH) may not be changed therebetween but may be maintained uniformly. In order to prevent confusion in a reception base station, without regard to "POWER LIMITED CASE" of a UE, the same rule (e.g., simultaneous transmission, piggyback, puncturing, (transmission) dropped, (transmission) stopped, etc.) may be applied (e.g., [Proposed method #1-1] to [Proposed method #1-4]).

As another example, in the case of not "POWER LIMITED CASE", a simultaneous transmission of ("overlapped") two channels is allowed, and on the other hand, in the case of "POWER LIMITED CASE", when the PUSCH (or LGD_PUCCH) is transmitted with "MODULATION ORDER" (e.g., "QPSK") which is smaller than or equal to a threshold value preconfigured (/signaled in advance), it may be transmitted with the form that only the transmission power of PUSCH (or LGD_PUCCH) which is overlapped with the SHD_PUCCH (region) is reduced (e.g., with the form that (maximum) transmission power of a UE is distributed between the PUSCH (or LGD_PUCCH) and the SHD_PUCCH according to a predefined rule), and on the other hand, in the case that the PUSCH (or LGD_PUCCH) is transmitted with "MODULATION ORDER" (e.g., "16 QAM") which is greater than a threshold value preconfigured (/signaled in advance), the transmission power of PUSCH (or LGD_PUCCH) which is overlapped with the SHD_PUCCH region is reduced, and simultaneously, additional DM-RS may be transmitted to the corresponding region part.

Figure 16:
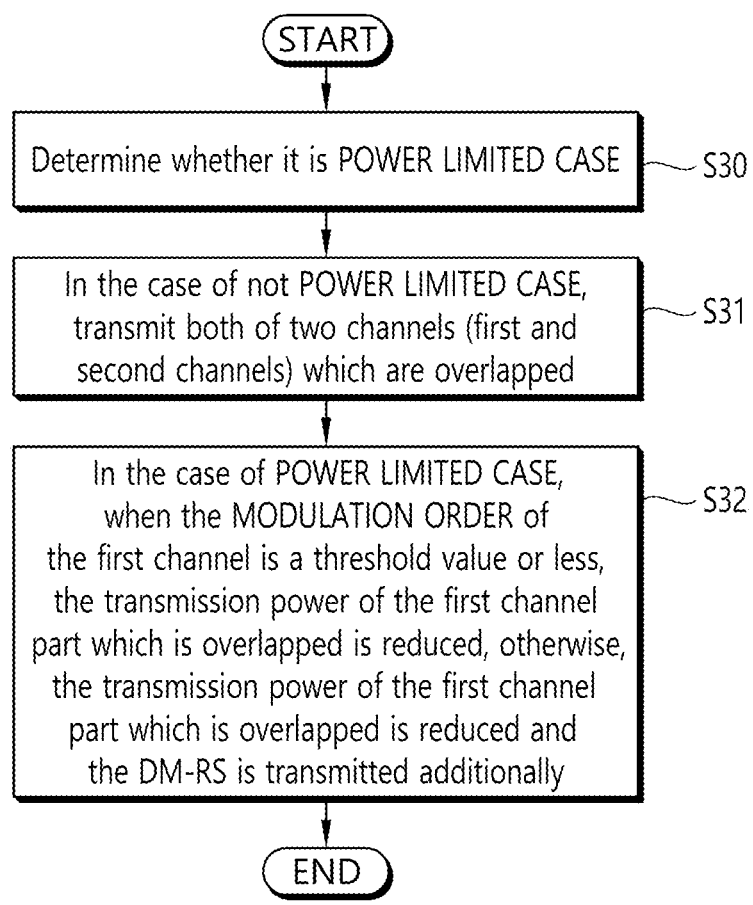
FIG. 16 illustrates a power control method for UL control channel.

FIG. 16 illustrates a power control method for UL control channel.

Referring to FIG. 16, a UE determines whether it is POWER LIMITED CASE (step, S30), and in the case of not POWER LIMITED CASE, the UE transmits both of two channels (first and second channels) which are overlapped (step, S31). In the case of POWER LIMITED CASE, when the MODULATION ORDER of the first channel is a threshold value or less, the transmission power of the first channel part which is overlapped is reduced, otherwise, the transmission power of the first channel part which is overlapped is reduced and the DM-RS is transmitted additionally (step, S32).

The additional DM-RS mapping may be performed by puncturing data of the PUSCH (or LGD_PUCCH). The additional DM-RS may be mapped on the first symbol of the PUSCH (or LGD_PUCCH) (region) part overlapped (with the SHD_PUCCH (region)) (and/or $W^{th}$ symbol which is predefined (/signaled in advance)).

The change of whether to transmit the additional DM-RS depending on "POWER LIMITED CASE" may be not preferable in an aspect of a reception base station which is difficulty in determining whether a UE is in "POWER LIMITED CASE" accurately. Accordingly, without regard to "POWER LIMITED CASE" of the UE, when the PUSCH (or LGD_PUCCH) is transmitted with "MODULATION ORDER" (e.g., "16 QAM") which is greater than a threshold which is preconfigured (/signaled in advance), the additional DM-RS may be transmitted always to the part which is overlapped with the SHD_PUCCH (region).

In the case that the rule is applied, the PUSCH (or LGD_PUCCH) transmission power may be changed in the middle.

The additional DM-RS mapping described above may be not applied (/performed) in the case that a DM-RS transmission is (already) configured on the PUSCH (or LGD_PUCCH) (region) part which is overlapped with the SHD_PUCCH (region) (e.g., if there is the PUSCH of which DM-RS density (on time axis) is increased owing to the reason such as (particularly) PUCCH of multiple symbol DM-RS structure, HIGH MOBILITY environment, etc.).

As another example, in the case of assuming that there is no case of indicating SHD_PUCCH transmission through the same symbol(s) on the timing after the LGD_PUCCH (or PUSCH) transmission is (already) started, without the (corresponding) additional DM-RS transmission, even in "POWER LIMITED CASE", it is transmitted in the transmission power in which PUSCH (or LGD_PUCCH) is reduced without change in the middle (together with the SHD_PUCCH) and/or the (corresponding) PUSCH (or LGD_PUCCH) transmission may be omitted (or stopped).

As another example, the additional DM-RS mapping rule (described above) may be (limitedly) applied only to the PUSCH overlapped with the SHD_PUCCH (region).

FIG. 17 illustrates a multiple slot LGD_PUCCH which may be introduced in NR.

Referring to FIG. 17, the LGD_PUCCH may be transmitted through slot #1 to slot #3, that is, multiple slots. This may be referred to as multiple slot LGD_PUCCH.

The following proposed methods proposes an efficient transmission power control method and/or information (or modulation coded symbol) mapping method and/or reference signal (RS) structure in the case that the "multiple slot LGD_PUCCH (or PUSCH) transmission" is performed, under the NR system.

[Proposed method #4-1] As an example, (A) the transmission power value (calculated) in the first slot may be applied in the same way to the remaining slots (OPTION #A) and/or (B) according to (predefined) TPC command reception/application time line, the transmission power value may be independently calculated/applied in each slot (OPTION #B) and/or (C) in the case of the slot in which a reference signal (RS, e.g., DM-RS) is transmitted (this is referred to as RS-slot), the transmission power value may be independently calculated/applied, and on the other hand, in the case of the slot in which a reference signal is not transmitted (this is referred to as NONRS-slot), the transmission power value (calculated) in the nearest RS-slot before (/after) is identically applied (OPTION #C).

Here, as an example, depending on "multiple slot LGD_PUCCH (or PUSCH)" (and/or "MODULATION ORDER" of "UCI (or data"), the applied rule may be differently defined. As a specific example, in the case of "QPSK", (OPTION #B) may be applied. On the other hand, in the case of "(16) QAM", (OPTION #A) (or (OPTION #C)) may be applied.

[Proposed method #4-2] The information (related to specific UCI (/transport block) to transmit (or modulation coded symbol) (A) may be mapped to the LGD_PUCCH (or PUSCH) on the first slot (preferentially), and then, mapped to the remaining slots (in the same way) repeatedly and/or (B) assuming that a plurality of slots is a single (virtual) "SUPER-SLOT" and mapped (in the SLOT-WISE form).

As another example, a plurality of transport blocks may be transmitted (together) through "multiple slot PUSCH" (e.g., PUSCH transmission based on "K" number of slots). At this time, the number (L) (e.g., "L<K") of consecutive slots which are used in a single transport block transmission may be preconfigured (/signaled in advance).

[Proposed method #4-3] In the case that the "multiple slot LGD_PUCCH (or PUSCH) transmission" is performed, (A) the reference signal structure (e.g., reference signal (symbol) position and/or (frequency/time) density, etc.) used in the "single slot LGD_PUCCH (or PUSCH)" may be repeatedly applied for each slot without any change and/or (B) the reference signal structure applied to the "multiple slot LGD_PUCCH (or PUSCH) transmission" may be additionally (or independently) configured (/signaled).

The following proposed methods proposes, in the case that the "multiple slot LGD_PUCCH (or PUSCH)" (partial) transmission and other channel (/signal) transmission (e.g., SHD_PUCCH (or SRS or PUSCH)) are "overlapped", a method for processing this efficiently is proposed.

[Proposed method #5-1] As an example, in the case that the "(transmission) dropped" rule should be applied to the "multiple slot LGD_PUCCH (or PUSCH)", (A) only the (LGD_PUCCH (or PUSCH)) transmission on (a part of) the slot which is actually overlapped with the SHD_PUCCH (or SRS or PUSCH) transmission is omitted and/or (B) the entire "multiple slot LGD_PUCCH (or PUSCH)" transmissions are omitted.

Alternatively, the "multiple slot LGD_PUCCH (or PUSCH)" (partial) transmission and other channel (/signal) transmission are "overlapped", (exceptionally) the other channel (/signal) transmission may be "(transmission) dropped" (always).

As another example, in the case that the "(transmission) stopped" rule should be applied to the "multiple slot LGD_PUCCH (or PUSCH)", (A) only the (LGD_PUCCH (or PUSCH)) transmission on (a part of) the slot which is actually overlapped with the SHD_PUCCH (or SRS or PUSCH) transmission is omitted and/or (B) (all) the (LGD_PUCCH (or PUSCH)) transmissions up to the most closest "slot boundary" thereafter including the (LGD_PUCCH (or PUSCH)) transmission on the (part of) symbol which is actually overlapped with the SHD_PUCCH (or SRS or PUSCH) transmission are omitted and/or (C) (all) the "multiple slot LGD_PUCCH (or PUSCH)" transmission thereafter including the (LGD_PUCCH (or PUSCH)) transmission on the (part of) symbol which is actually overlapped with the SHD_PUCCH (or SRS or PUSCH) transmission are omitted.

Alternatively, in the case that the "multiple slot LGD_PUCCH (or PUSCH)" (partial) transmission and other channel (/signal) transmission are "overlapped", exceptionally the other channel (/signal) transmission may be "(transmission) stopped" (always).

As another example, in the case that the rule of piggybacking the SHD_PUCCH (or PUSCH) to the "multiple slot LGD_PUCCH (or PUSCH)" needs to be applied, (A) it is piggybacked to the (LGD_PUCCH (or PUSCH)) on (a part of) the slot which is actually overlapped with the SHD_PUCCH (PUSCH) transmission (and/or piggybacked to the $N^{th}$ (LGD_PUCCH (or PUSCH)) (on slot) which is preconfigured (/signaled in advance) (always)) and/or (B) (without regard to actual overlap) it is piggybacked to the LGD_PUCCH (or PUSCH) of all slots (repeatedly).

On the other hand, in the case that the rule of piggybacking the "multiple slot LGD_PUCCH (or PUSCH)" to the PUSCH (or SHD_PUCCH) needs to be applied, the LGD_PUCCH (or PUSCH) on the (part of) slot which is actually overlapped may be piggybacked to the PUSCH (or SHD_PUCCH).

Under the NR system, when "aperiodic CSI (/SRS)" transmission is triggered on the DCI (this is referred to as MUSL-DCI) that indicates (/schedules) the "multiple slot LGD_PUCCH (or PUSCH)", the following (part of) rule may be applied.

[Proposed method #6-1] As an example, (A) the "aperiodic CSI (/SRS)" transmission is performed only on the $N^{th}$ slot (e.g., "N=1") which is preconfigured (/signaled in advance) and/or (B) the "aperiodic CSI (/SRS)" transmission is (repeatedly) performed on all slots.

Alternatively, through the field of the corresponding use defined on the MUSL-DCI, the order of slot on which the "aperiodic CSI (/SRS)" transmission is performed may be signaled.

Under the NR system, a specific channel (/signal) (e.g., LGD_PUCCH, PUSCH (and/or SHD_PUCCH, SRS)) related hopping bandwidth and/or mapping region may be determined according to the following (part of) rule.

As an example, in order to prevent (excessive) "(power) TRANSIENT PERIOD", "(intra-slot) (frequency) hopping" is not applied to the SHD_PUCCH (e.g., (limitedly) applied to the LGD_PUCCH (or PUSCH)) (and/or not applied to the PUCCH including symbols of the number smaller than a threshold value which is preconfigured (/signaled in advance)).

[Proposed method #7-1] In the entire system band, (sub) band information in which (frequency) hopping of the LGD_PUCCH (/PUSCH) (and/or the SHD_PUCCH (/SRS)) is performed and/or (sub) band information in which "distributed mapping" of the SHD_PUCCH (/SRS) (and/or the LGD_PUCCH (/PUSCH)) may be signaled.

Since the examples for the proposed methods may be included as one of the implementation methods of the present invention, it is apparent fact that the examples for the proposed methods may be regarded as a sort of proposed methods. In addition, although the proposed methods described above may be independently implemented, proposed methods may be implemented in a combination (or merge) of a part of the proposed methods. The scope of system to which the proposed methods are applied may be extended to other systems in addition to 3GPP LTE/LTE-A system. For example, the proposed methods may be limited applied only to the case that the LGD_PUCCH (or PUSCH (or SRS)) and the SHD_PUCCH (or SRS (or PUSCH)) are transmitted (with being "overlapped") on the same slot (and/or time domain).

Alternatively, the proposed methods of the present invention may be limited applied only to the SHD_PUCCH (and/or distributed SHD_PUCCH) locally. For example, the proposed methods of the present invention may be limited applied only to "overlap" handling between the LGD_PUCCH (or PUSCH (or SRS)) and the SHD_PUCCH (or SRS (or PUSCH)) of a "SINGLE UE" (and/or "different UEs with each other").

Alternatively, the proposed methods of the present invention may be limited applied only to the SHD_PUCCH (and/or LGD_PUCCH) and/or PUSCH (and/or SRS) transmission in "SC-FDM" (or "DFT-S-OFDM") (or "OFDM") form.

Figure 18:
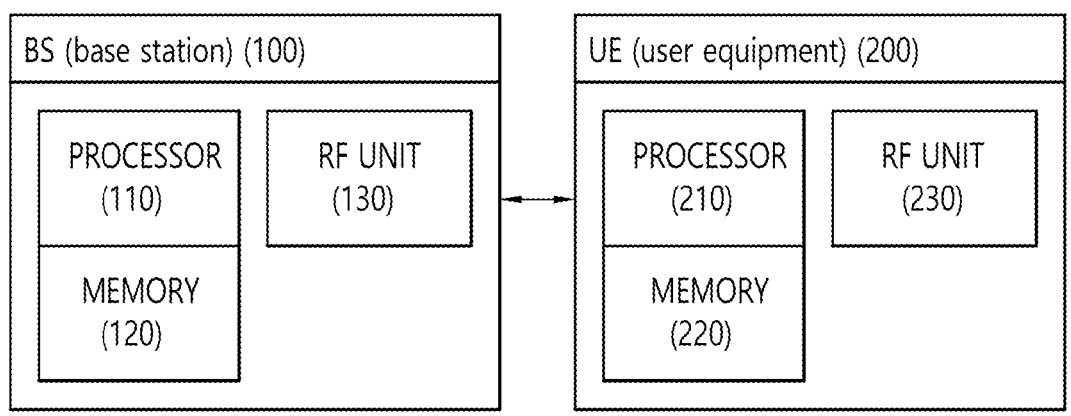
FIG. 18 is a block diagram illustrating a communication apparatus in which the embodiment of the present invention is implemented.

FIG. 18 is a block diagram illustrating a communication apparatus in which the embodiment of the present invention is implemented.

Referring to FIG. 18, a base station 100 includes a processor 110, a memory 120 and a radio frequency (RF) unit 130. The processor 110 implements the proposed function, process and/or method. The memory 120 is connected to the processor 110 and stores various types of information for driving the processor 110. The RF unit 130 is connected to the processor 110 and transmits and/or receives a wireless signal. The RF unit 130 may also be referred to as a transceiver.

A UE 200 includes a processor 210, a memory 220 and a RF unit 230. The processor 210 implements the proposed function, process and/or method. For example, the processor 210 may perform a UL communication by receiving parameter related to the UL communication and applying the parameter, which is independently configured for each analog beam. In this case, in the case of performing the UL communication by using a specific analogue beam, the parameter related to the UL communication set to the specific analogue beam may be applied to the UL communication. The memory 220 is connected to the processor 210 and stores various types of information for driving the processor 210. The RF unit 230 is connected to the processor 210 and transmits and/or receives a wireless signal. The RF unit 230 may also be referred to as a transceiver.

The processor 110 or 210 may include a converter that converts different chip set, logical signal, data processing device and/or baseband signal and wireless signal with each other.

The memory 120 or 220 may include read-only memory (ROM), random access memory (RAM), flash memory, memory card, storage medium and/or other storage device. The RF unit 130 or 230 may include one or more antennas for transmitting and/or receiving a wireless signal. When the embodiment is implemented by software, the technique described above may be implemented by a module (process, function, etc.) for performing the function described above. The module may be stored in the memory 120 or 220 and executed by the processor 110 or 210. The memory 120 or 220 may be located interior or exterior to the processor 110 or 210 and may be connected to the processor 110 or 210 with various well-known means.

What is claimed is:

1. A method for transmitting uplink control information (UCI) and a sounding reference signal (SRS) by a user equipment (UE) in a wireless communication system, the method comprising:
generating the UCI;
transmitting more than one physical uplink shared channels (PUSCHs),
wherein based on physical uplink control channel (PUCCH) resources of a first PUCCH not overlapping in time with the more than one PUSCHs, the UCI is transmitted through the first PUCCH, and
wherein based on the PUCCH resources of the first PUCCH overlapping in time with the more than one PUSCHs, the UCI is transmitted through only a predefined $N^{th}$ PUSCH among the more than one PUSCHs;
determining that at least one SRS symbol, among a plurality of symbols to be used for transmitting the SRS, overlaps in time with at least one PUCCH symbol to be used for transmitting a second PUCCH; and
based on the at least one SRS symbol overlapping in time with the at least one PUCCH symbol:
based on the SRS being a periodic SRS, and based on the second PUCCH being configured to carry channel state information (CSI): (i) dropping, among the plurality of symbols to be used for transmitting the SRS, only the at least one SRS symbol that overlaps with the at least one PUCCH symbol, and (ii) transmitting the SRS through at least one symbol, among the plurality of symbols, excluding the at least one SRS symbol; and
based on the SRS being an aperiodic SRS, and based on the second PUCCH being configured to carry periodic CSI: not transmitting the second PUCCH.

2. The method of claim 1, wherein the UCI comprises at least one of (i) Hybrid Automatic Repeat and request (HARQ) acknowledgement/negative-acknowledgement (ACK/NACK) or (ii) channel state information (CSI).

3. The method of claim 1, wherein the UE supports a transmission of a PUCCH over one slot or multiple slots.

4. The method of claim 1, wherein the UE supports a transmission of a PUSCH over one slot or multiple slots.

5. The method of claim 1, wherein the UE transmits a PUCCH carrying UCI using at least one symbol.

6. The method of claim 1, wherein priorities for setting a transient period is defined in order of (i) a short PUCCH comprising 1 or 2 symbols, (ii) a sounding reference signal (SRS), (iii) a long PUCCH comprising 4-14 symbols, and (iv) PUSCH.

7. The method of claim 1, wherein the $N^{th}$ PUSCH is predefined at a fixed $N^{th}$ position among the more than one PUSCHs that are transmitted by the UE.

8. A user equipment (UE) configured to operate in a wireless communication system, the UE comprising:
a transceiver;
at least one processor; and
at least one computer memory operably connectable to the at least one processor and storing instructions that, when executed by the at least one processor, perform operations comprising:
generating uplink control information (UCI);
transmitting, by the transceiver, more than one physical uplink shared channels (PUSCHs),
wherein based on physical uplink control channel (PUCCH) resources of a first PUCCH not overlapping in time with the more than one PUSCHs, the UCI is transmitted through the first PUCCH, and
wherein based on the PUCCH resources of the first PUCCH overlapping in time with the more than one PUSCHs, the UCI is transmitted by the transceiver, through only a predefined $N^{th}$ PUSCH among the more than one PUSCHs;
determining that at least one sounding reference signal (SRS) symbol, among a plurality of symbols to be used for transmitting the SRS, overlaps in time with at least one PUCCH symbol to be used for transmitting a second PUCCH; and
based on the at least one SRS symbol overlapping in time with the at least one PUCCH symbol:
based on the SRS being a periodic SRS, and based on the second PUCCH being configured to carry channel state information (CSI): (i) dropping, among the plurality of symbols to be used for transmitting the SRS, only the at least one SRS symbol that overlaps with the at least one PUCCH symbol, and (ii) transmitting the SRS through at least one symbol, among the plurality of symbols, excluding the at least one SRS symbol; and
based on the SRS being an aperiodic SRS, and based on the second PUCCH being configured to carry periodic CSI: not transmitting the second PUCCH.

9. The UE of claim 8, wherein the $N^{th}$ PUSCH is predefined at a fixed $N^{th}$ position among the more than one PUSCHs that are transmitted by the UE.

10. The UE of claim 8, wherein the UCI comprises at least one of (i) Hybrid Automatic Repeat and request (HARQ) acknowledgement/negative-acknowledgement (ACK/NACK) or (ii) channel state information (CSI).

11. The UE of claim 8, wherein the UE supports a transmission of a PUCCH over one slot or multiple slots.

12. The UE of claim 8, wherein the UE supports a transmission of a PUSCH over one slot or multiple slots.

13. The UE of claim 8, wherein the UE transmits a PUCCH carrying UCI using at least one symbol.

14. The UE of claim 8, wherein priorities for setting a transient period is defined in order of (i) a short PUCCH comprising 1 or 2 symbols, (ii) a sounding reference signal (SRS), (iii) a long PUCCH comprising 4-14 symbols, and (iv) PUSCH.

15. The UE of claim 8, wherein the UE is in communication with at least one of (i) a mobile terminal, (ii) a network, (iii) or autonomous vehicles other than the UE.

16. The method of claim 1, wherein based on the SRS being the aperiodic SRS, and based on the second PUCCH being configured to carry the periodic CSI:
the SRS is transmitted through at least one symbol among the plurality of symbols to be used for transmitting the SRS.

17. The UE of claim 8, wherein based on the SRS being the aperiodic SRS, and based on the second PUCCH being configured to carry the periodic CSI:
the SRS is transmitted through at least one symbol among the plurality of symbols to be used for transmitting the SRS.

18. An apparatus configured to control a wireless communication device to operate in a wireless communication system, the apparatus comprising:
at least one processor; and
at least one computer memory operably connectable to the at least one processor and storing instructions that, when executed by the at least one processor, perform operations comprising:
generating uplink control information (UCI);
transmitting more than one physical uplink shared channels (PUSCHs),
wherein based on physical uplink control channel (PUCCH) resources of a first PUCCH not overlapping in time with the more than one PUSCHs, the UCI is transmitted through the first PUCCH, and
wherein based on the PUCCH resources of the first PUCCH overlapping in time with the more than one PUSCHs, the UCI is transmitted through only a predefined $N^{th}$ PUSCH among the more than one PUSCHs;
determining that at least one sounding reference signal (SRS) symbol, among a plurality of symbols to be used for transmitting the SRS, overlaps in time with at least one PUCCH symbol to be used for transmitting a second PUCCH; and
based on the at least one SRS symbol overlapping in time with the at least one PUCCH symbol:
based on the SRS being a periodic SRS, and based on the second PUCCH being configured to carry channel state information (CSI): (i) dropping, among the plurality of symbols to be used for transmitting the SRS, only the at least one SRS symbol that overlaps with the at least one PUCCH symbol, and (ii) transmitting the SRS through at least one symbol, among the plurality of symbols, excluding the at least one SRS symbol; and
based on the SRS being an aperiodic SRS, and based on the second PUCCH being configured to carry periodic CSI: not transmitting the second PUCCH.

* * * * *